United States Patent [19]

Jindrick et al.

[11] Patent Number: 4,535,409
[45] Date of Patent: Aug. 13, 1985

[54] MICROPROCESSOR BASED RECLOSER CONTROL

[75] Inventors: James A. Jindrick, Racine; Thomas G. Dolnik, Kenosha; Naresh K. Nohria, Milwaukee; Clyde Gilker, So. Milwaukee; James R. Hurley, Brookfield; Michael P. Dunk, Racine; Norbert J. Reis; Thomas J. Bray, both of Milwaukee, all of Wis.

[73] Assignee: McGraw-Edison Company, Rolling Meadows, Ill.

[21] Appl. No.: 303,626

[22] Filed: Sep. 18, 1981

[51] Int. Cl.³ .......................... G06G 7/62; G06G 7/63; G01R 19/00; G01R 21/00
[52] U.S. Cl. ............................... 364/481; 307/132 E; 361/71; 364/483; 364/492
[58] Field of Search ............... 364/184, 480, 481, 482, 364/483, 492, 493; 361/44, 47, 71, 74, 96, 97; 307/116, 126, 132 E, 132 EA; 324/51, 52; 335/6, 7, 8, 26, 27, 28

[56] References Cited

U.S. PATENT DOCUMENTS

| | | | |
|---|---|---|---|
| 3,878,436 | 4/1975 | Bogel | 361/72 |
| 4,276,605 | 6/1981 | Okamoto et al. | 364/481 X |
| 4,328,551 | 5/1982 | Yamaura et al. | 364/492 |
| 4,338,647 | 7/1982 | Wilson et al. | 364/492 X |
| 4,419,619 | 12/1983 | Jindrick et al. | 364/483 X |

OTHER PUBLICATIONS

"Microprocessor-Based Control of Distribution System"; IEEE Publication 81SM 480-483; McGraw-Edison; Jun. 4, 1981.

"Distribution System Automation"; McGraw-Edison; Apr. 1979.

"Computer Relaying"; IEEE Text, 79 EH01-48-7-PWR; 1979.

Primary Examiner—Errol A. Krass
Assistant Examiner—Kevin J. Teska
Attorney, Agent, or Firm—Jon Carl Gealow; Hugh M. Gilroy

[57] ABSTRACT

A microprocessor based recloser control has a microcomputer for causing trip and close operations of a recloser in response to the conditions of the power distribution lines being protected and operator commands. The microcomputer may be overridden by a mechanical switch in the recloser control. If power to the recloser control is lost, the microprocessor will continue to function with power storage means for a limited duration. Towards the end of that duration, this microcomputer will power down the microprocessor in an orderly manner allowing automatic return to its functions when power is restored. After the microprocessor is no longer functioning, a secondary overcurrent trip circuit is relied upon to cause a trip operation of the recloser for extended durations of power outage. The secondary overcurrent trip circuit can be disabled by the microprocessor. The microcomputer includes means to normalize the input signals from the power distribution lines and multiple redundancy features to prevent undesired operations of the recloser. The recloser control functions in response to the mean square of the currents in the protected power distribution lines, and includes means for protecting its more sensitive components from input signals normally encountered.

9 Claims, 33 Drawing Figures

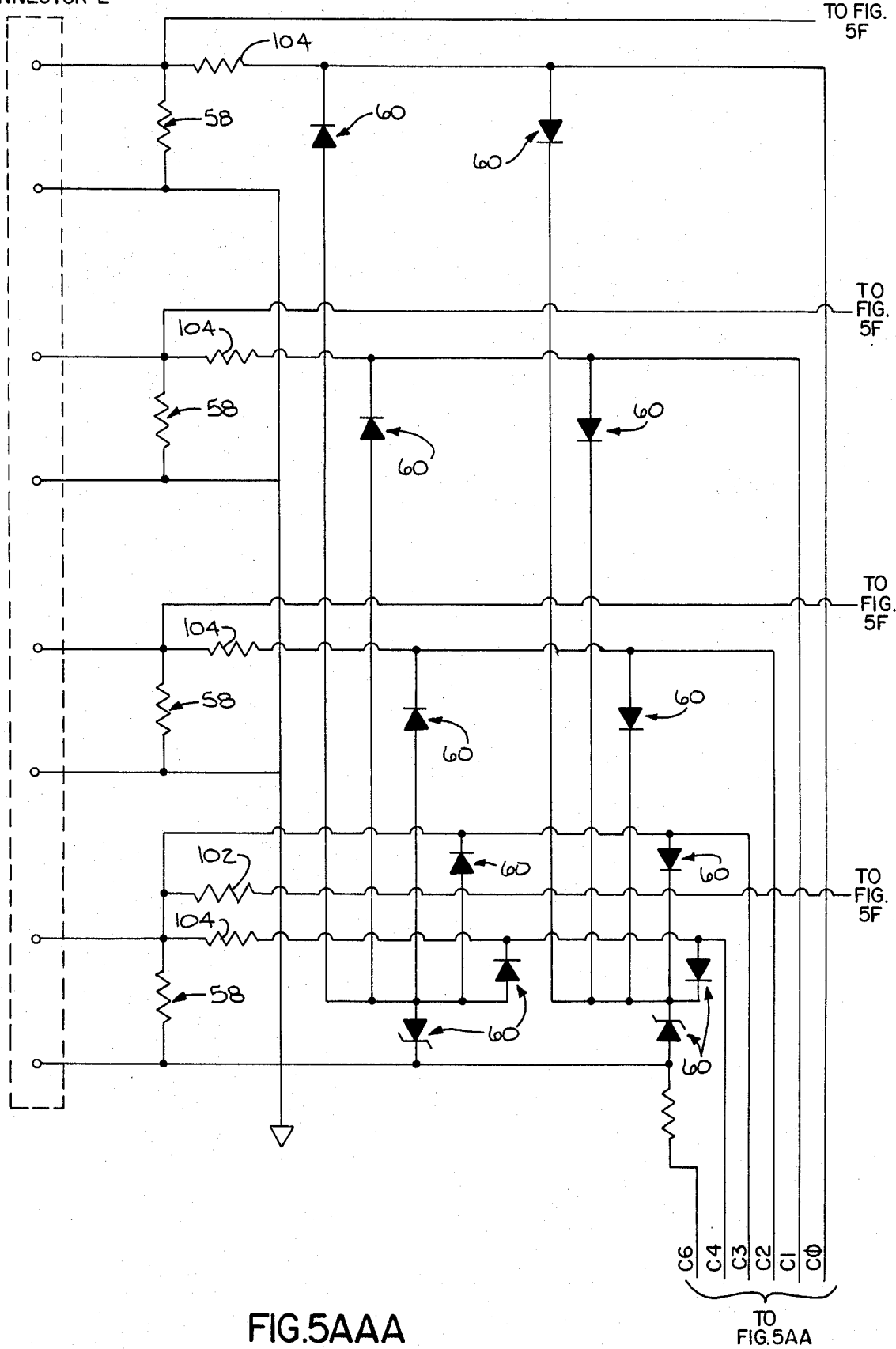
FIG.5AAA

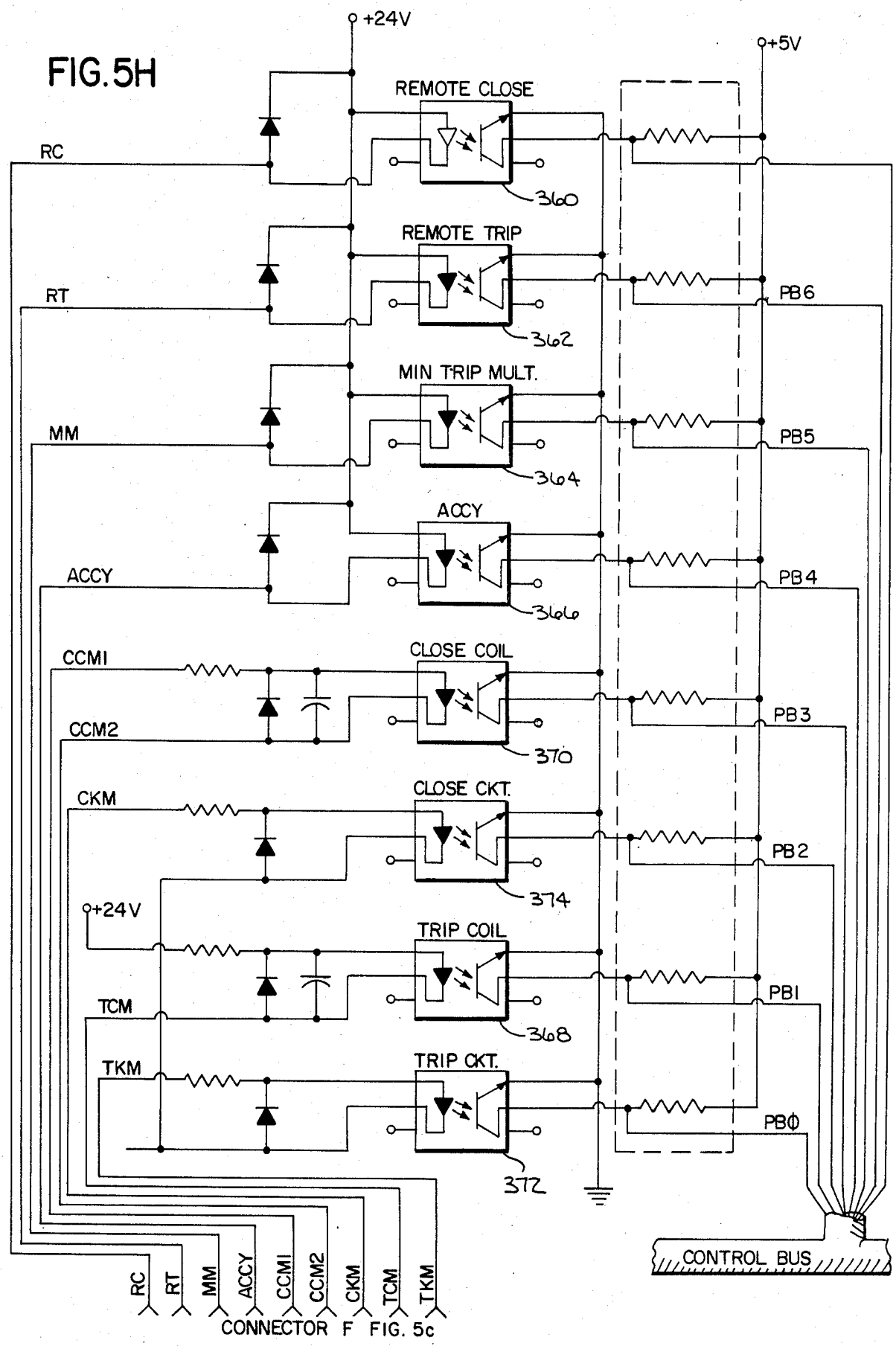

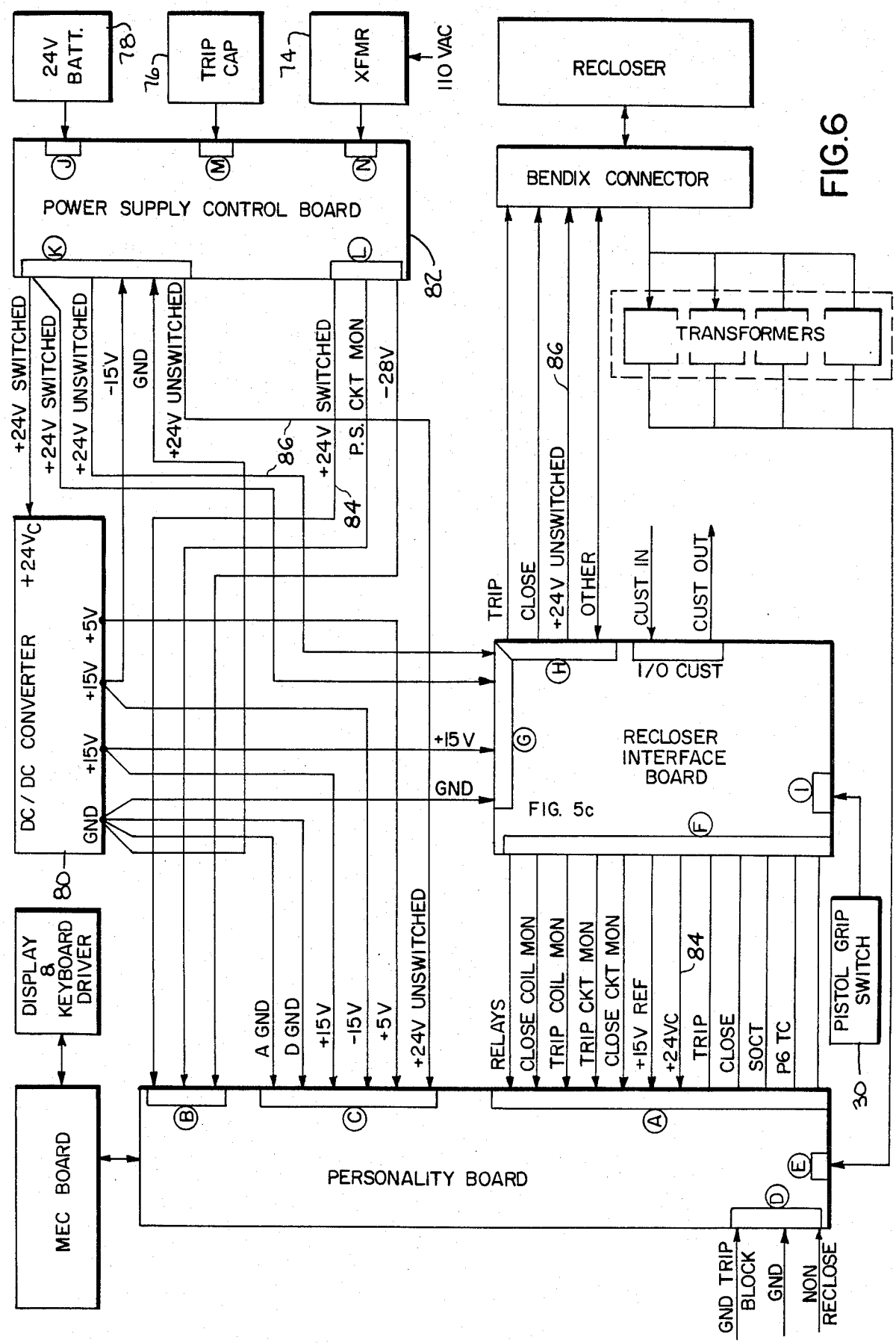

OVERALL SYSTEM STRUCTURE

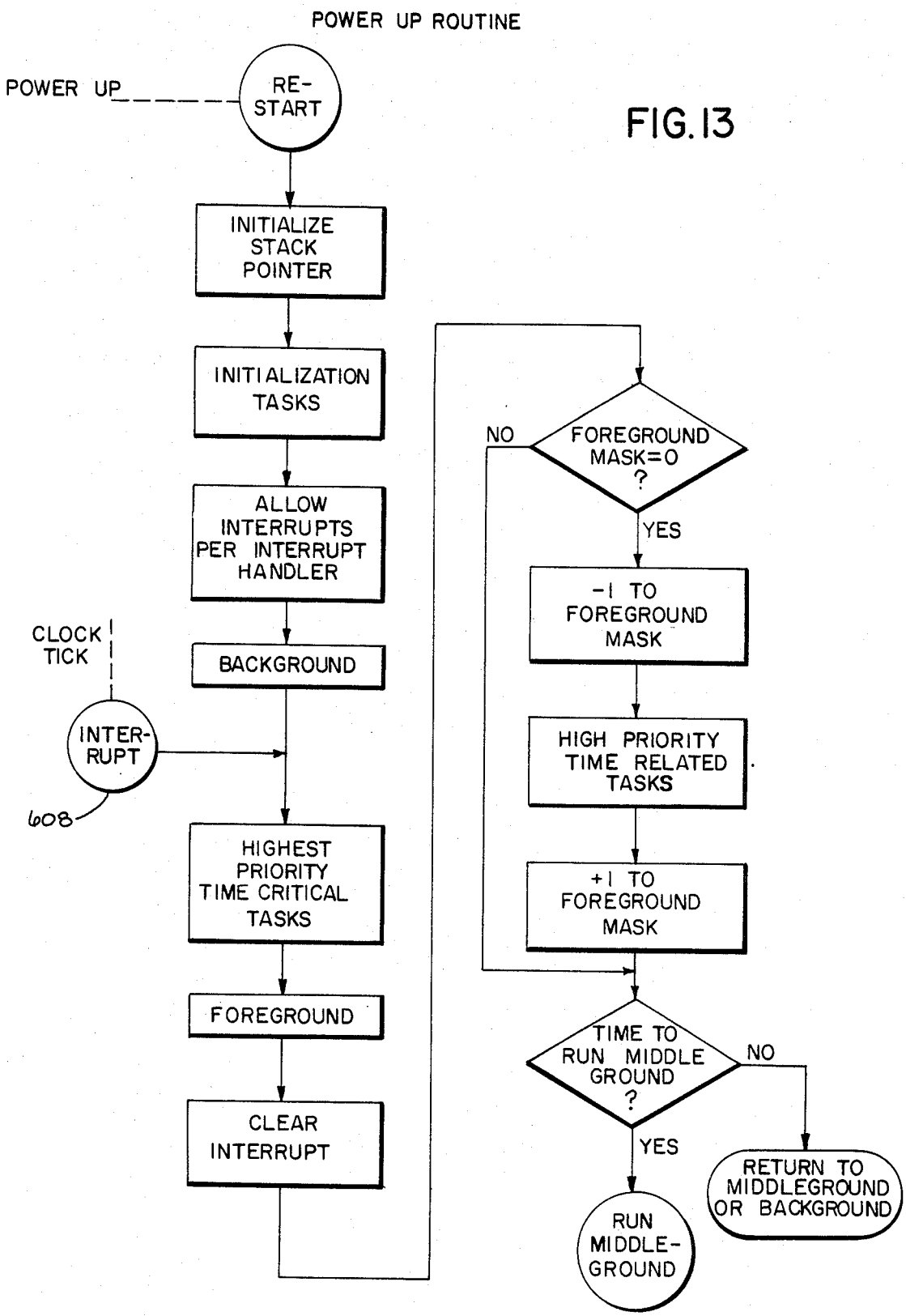

MICROPROCESSOR BASED RECLOSER CONTROL

BACKGROUND OF INVENTION

There have been five dramatic leaps in electronic technology during the past hundred years. The first four include the light bulb, electron tube, transistor, and integrated circuit. The most recent jump, and perhaps the most significant, has been the emergence of the microprocessor in the 1970's and 1980's. A microprocessor and associated memory and interfacing components form a microcomputer, a physically small digital machine as powerful as a room-sized computer of only two decades ago. These microcomputers have found almost limitless applications from electronic games, calculators, microwave ovens, and point of sale terminals, to stop-and-go lights, automobile ignition controls, copying machine controls, and deep space probes. The microcomputer has been a leading factor in the proliferation of automated processing controls including industrial robots. However, there have been few microprocessor applications to electric power transmission and distribution systems. In particular, there has been nothing comparable to "automatable" control of the protective and operating apparatus used on power systems. The emergence of the microcomputer provides the technical capability to produce just such controls.

A control based on microprocessors will perform the functions of those formerly produced in a more economical manner and allow the additions of functions which were economically or technically unfeasible.

Reclosers are inserted into power lines to protect a power distribution system. Most faults on power distribution lines are of the momentary nature and of sufficient magnitude to blow fuses if allowed to be conducted to them. When a fuse does blow in a power distribution system, it is necessary to send somebody to change it which is a somewhat expensive proposition. A primary function of a recloser is to save fuses. In general this is done by sensing the peak value of the current conducted and interrupting its flow by opening or tripping a recloser before the fuses can blow. After an interval the recloser closes restoring power to the system where it remains closed until the next fault is sensed. The rate at which a fuse will blow and interrupt current is a function of the thermal heating of the fusible element. The rate of thermal heating is proportional to the power generated by the fault and each fuse has a time current characteristic which describes the time interval required to interrupt the fault current. The time interval is generally approximately inversely proportional to the value of the root mean square of the fault current. It is desireable to coordinate the recloser with the fuses to be saved to insure that the recloser in fact interrupts temporary fault currents before the fuses to be protected are blown. This is generally done by approximating the root mean square value of the fault current by sensing its peak value. It must also be recognized that all faults which occur on a power distribution line are not temporary, such as those caused by a branch momentarily falling against the line. Some faults are of a more permanent nature such as those caused by a line falling to the ground. As a consequence, reclosers are built so that they will only trip a limited number of times within a short duration before locking open. Were this not done a recloser would cycle until failure and many of the fuses to be protected would blow anyway. At some magnitude of fault current it is desireable to have the recloser open immediately to protect the line rather than following a time current characteristic. At intermediate levels it may be desireable from the power distribution stand-point to allow the fault current to flow for a limited period to allow the fault to burn itself open or blow the fuse. Many reclosers have alternate time current characteristics which achieve this goal. Typically a recloser will allow two shots or trip operations to follow a fast time current characteristic and two additional shots along a somewhat slower time current characteristic before locking open or out.

The advantages to be gained in building a microprocessor based recloser control are many and several of them are well recognized. The principle reason it has not been previously done is that a microprocessor based microcomputer is a comparatively low power, low voltage, low current device which could not survive much less reliably operate in the hostile environment surrounding power distribution controls such as reclosers.

SUMMARY OF INVENTION

By taking advantage of the similarity of various power system control design requirements, a series of microprocessor-based modules have been created which are usable as design "building blocks" in a number of electrical power distribution and control applications. This concept maximizes the effectiveness and flexibility of microprocessors in meeting present and future control requirements. Other advantages of this modular approach includes: control panels which function in a similar manner, reduced operator learning time; a common design base for maximum reliability and performance in a power system environment; and common servicing techniques.

There are a number of advantages to the use of the modular concept in microcomputer-based power system controls. Various advantageous operating features are automatically incorporated into every control, including simplified servicing techniques; remote communications capabilities with programmable protocols; and "watch-dog" timers. In addition, all front panels operate in a similar manner resulting in easier field training. Servicing techniques and equipment are common between controls, minimizing repair time. Maximum software reliability is insured by using a proven operating system. Every module can be thoroughly tested before being incorporated. By maximizing the use of software for the controls functions, features are easily changed or added. By using a common circuit board in production, reliability is maximized while costs are minimized. Microprocessor based controls open up a new dimension in power system controls with applications and benefits limited only by the imagination and ingenuity of the user.

The microprocessor based recloser control includes an input circuit which senses current associated with the power line to be protected, miltiplexes the proportional input analog signal, normalizes the analog signal to save component cost and, samples the normalized signal with a sample and hold circuit before digitizing by the analog to digital converter. A microcomputer based on a microprocessor and associated memories and interfacing components, is used in the recloser control to process input signals in a manner appropriate to the basic requirement for a recloser control and provides new functions previously unatainable. A power supply which selectively provides power to other components of the control system and includes power storage means to supply power when the protected lines are interrupted is provided in the control. The control includes programmable non-volatile memory to retain changeable basic information when power is interrupted. A secondary overcurrent trip circuit in the control functions independently of the microcomputer when the microcomputer is disabled to effect a trip operation of the recloser. A protective input network protects the control's low power devices from the hostile environment of the power distribution system and scaling means are used to allow the microcomputer and associated circuitry to function with more precision in the range of input signal magnitudes where precision is desireable and to allow the control to function with a limited number of components over a wide range of input signals.

BRIEF DESCRIPTION OF THE DRAWINGS

FIG. 6 is a wiring diagram for the recloser control which incorporates information concerning the relationship between the components of the control and recloser.

FIG. 13 is a flow chart illustrating the restart and foreground routines contained in part within the housekeeping module of FIG. 12.

DETAILED DESCRIPTION

One of the keys to the present approach of microcomputer design is to take advantage of the similarity of various power system controls by subdividing both hardware and software design requirements into common modules applicable to all. Once these modules are designed and developed, they form a set of reusable "building blocks". These modules can then be combined to create the foundation for a particular control.

There are two basic design areas that make up a microprocessor based control. The physical elements, such as integrated circuits, resistors, capacitors, displays, switches, and so forth, are called "hardware". Once constructed, they are not readily changeable.

The second basic design area in the microcomputer is non-physical and includes algorithms, computer programs, and documentation. These elements are called "software" since they are readily changeable.

Figure 1:
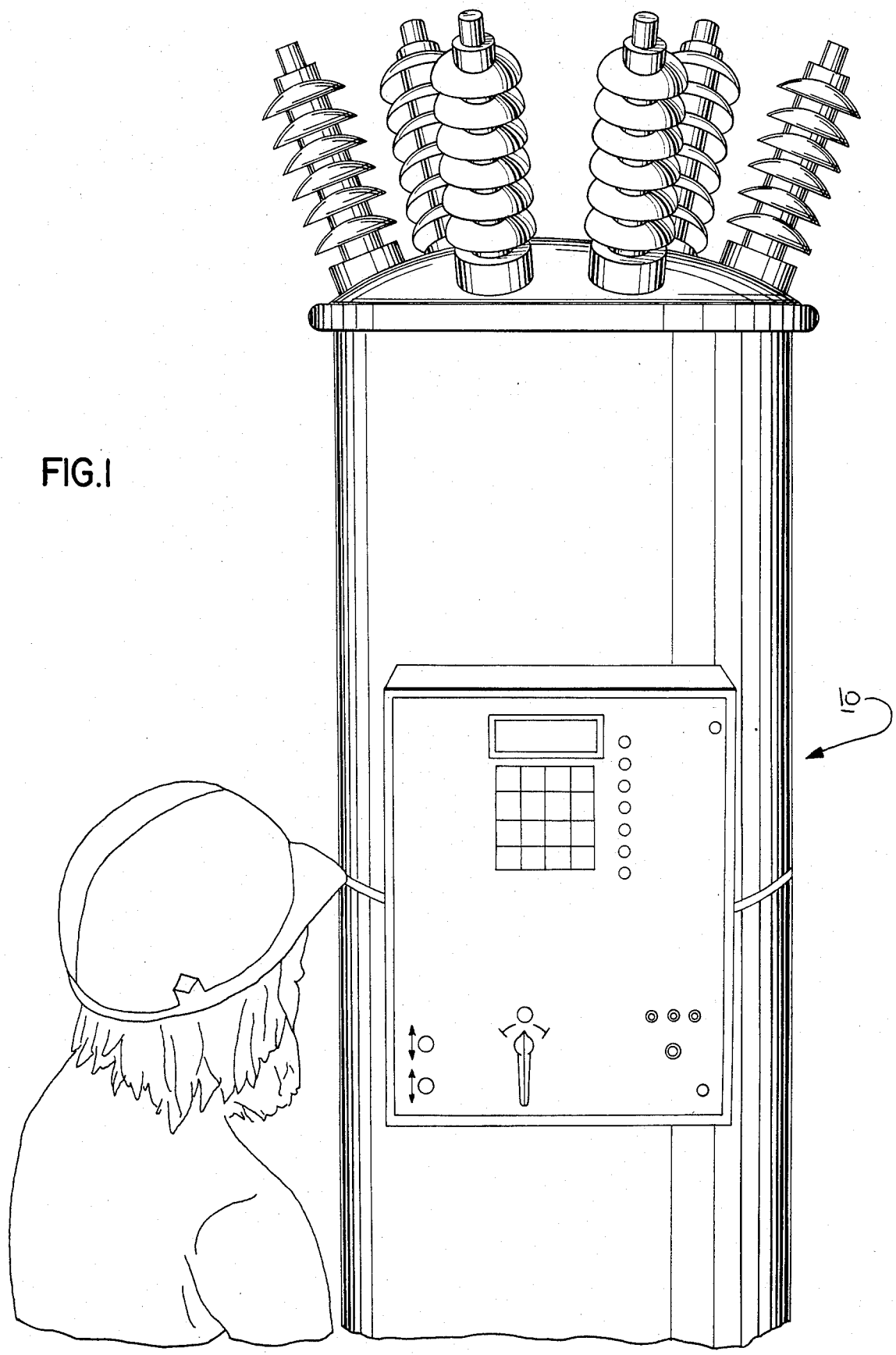
FIG. 1 is a stylized representation of a recloser and a pictorial representation of the microprocessor based recloser control
Figure 1A:
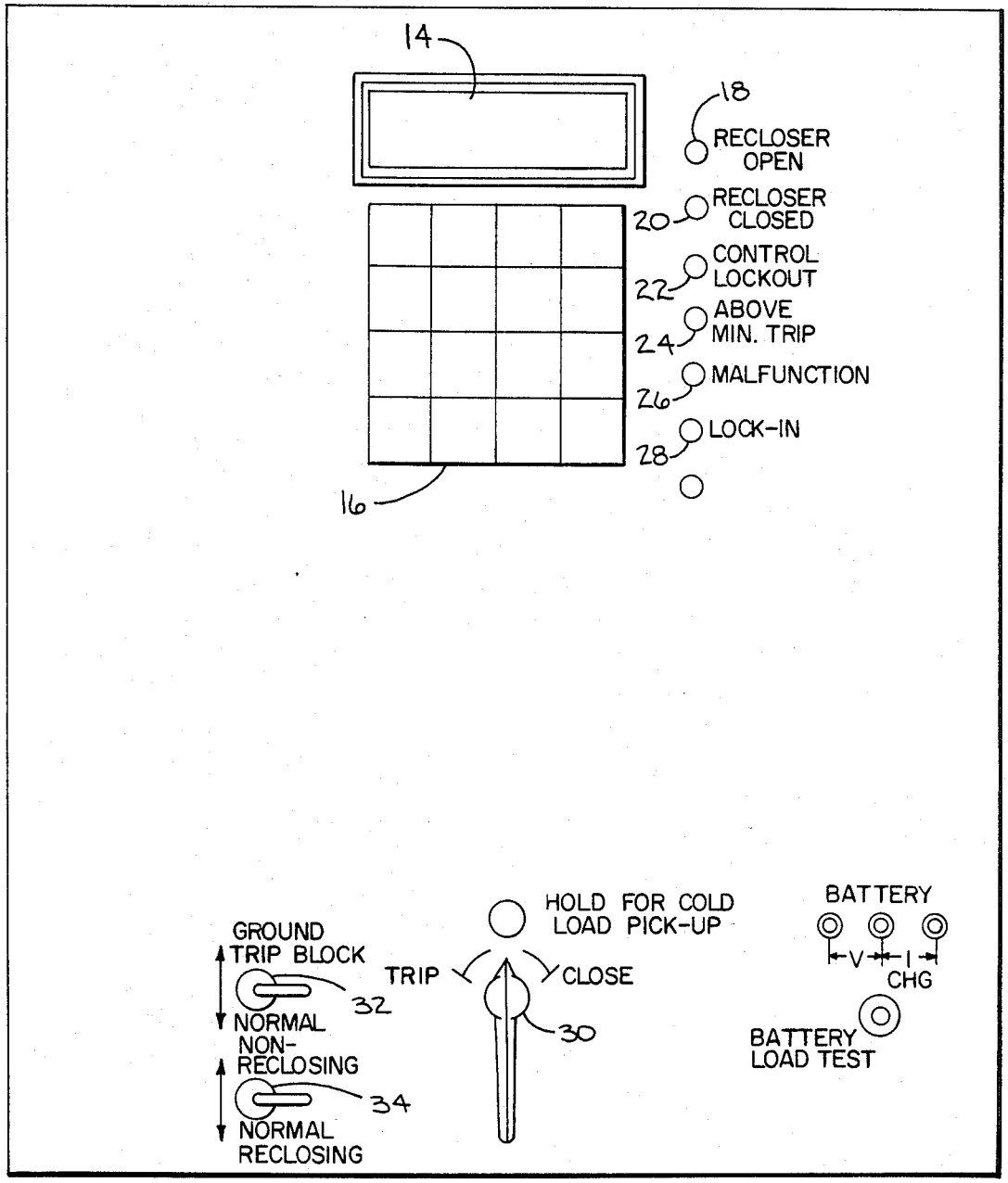
FIG. 1A is a pictorial representation of the front panel of the recloser control.

FIG. 1 illustrates the recloser control 10 of the present invention in association with a stylized representation of a recloser 12. FIG. 1A is an enlarged view showing the front panel of recloser control 10. The panel includes a six digit LED display 14 for displaying information. Also shown is keyboard 16 for entering information and seven indicating lamps (18, 20, 22, 24, 26, 28). The lamps provide status information for recloser open 18, recloser closed 20, control lock out 22, above minimum trip 24, malfunction 26 and lock in 28. Pistol grip switch 30 is a master override for the control which is spring loaded to return to the center neutral position after being moved to the trip or closed position. While the switch operator is spring loaded, some contacts associated with pistol grip switch 30 selectively remain in the last operated position while the handle returns to the neutral position. Ground trip block switch 32 will prevent a trip due to a ground fault when the switch is in its upper position. When ground trip block switch 32 is in its lower normal position the recloser control 10 will trip the recloser when a ground fault occurs. Below ground trip block switch 32 is non reclose switch 34 which prevents reclose when it is in its upper position, but allows recloser control 10 to function normally when switch 34 is in its lower position.

Figure 17:
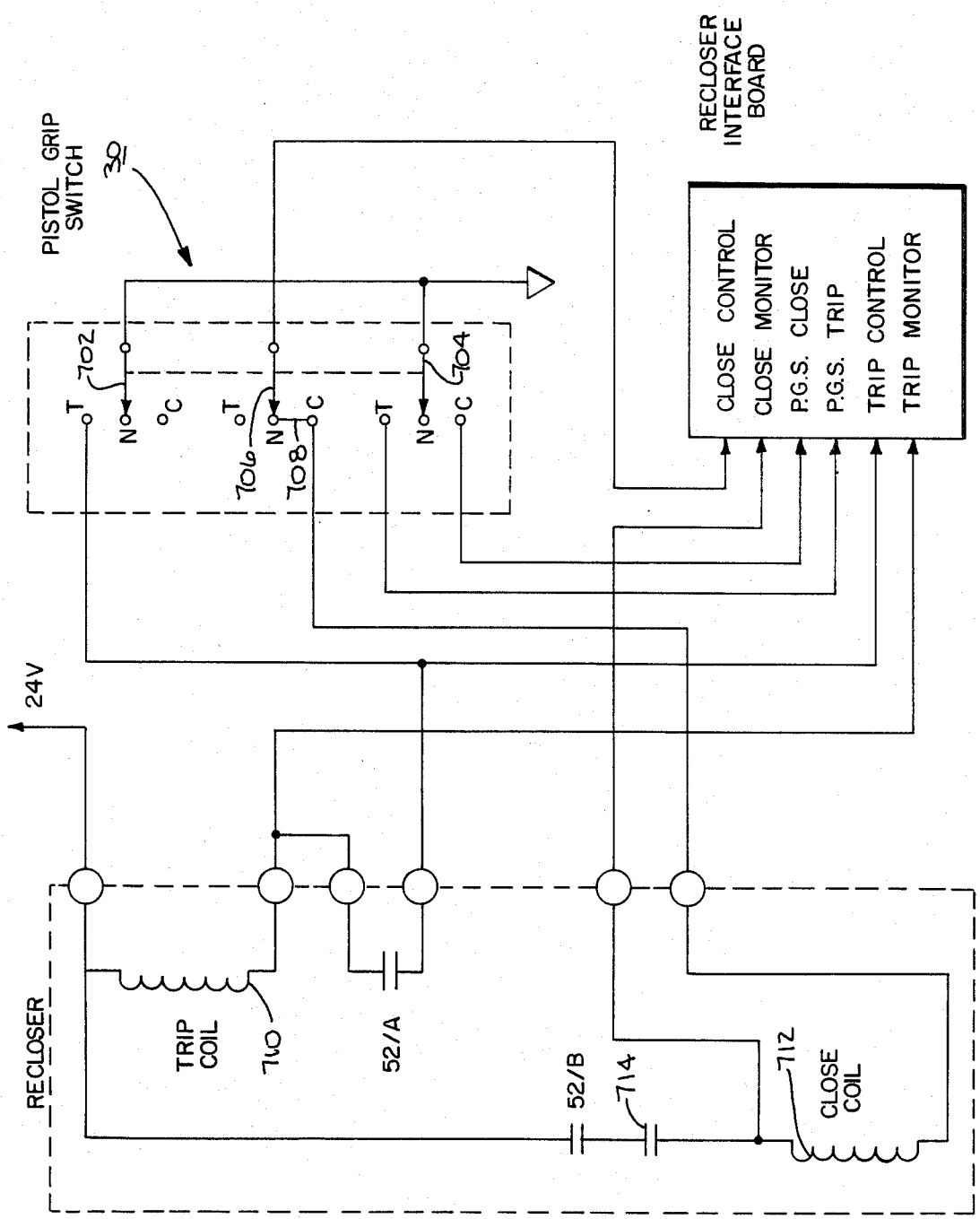
FIG. 17 illustrates various interlocks between the recloser and the front panel of the control.

The relationship between the trip and close coils, recloser switch interlocks, and the recloser interface board, is illustrated in FIG. 17. The contacts associated with pistol grip switch 30 are of two distinct types. Those associated with wipers 702 and 704 are momentary contacts. Those associated with wiper 706 include drag contacts. Drag contact bar 708 will only remain in position between wiper 706 and the close contact C when pistol grip switch 30 is turned to the closed position and returns to the neutral position. N contacts represent those contacts which the wipers 702, 704 and 706 contact, when the pistol grip switch 30 returns to its spring loaded neutral position. T contacts indicate the position of the wipers when the switch is thrown to the trip position as do the C contacts, when the switch is thrown to the close position. Drag contact bar 708 only maintains contact between the N contact and the C contact after pistol grip switch 30 has been thrown to the closed position. Drag contact bar 708 will not maintain contact between the T contact and the N contact associated with wiper 706.

Trip coil 710 and close coil 712 each, have interlock contacts in series with their source of voltage from recloser control 10. Same interlock contact 52/A is a switch contact which is mechanically operated by the recloser mechanism, and is in the same state as the interrupting contacts of the recloser. Opposite interlock contact 52/b is likewise a mechanically activated switch contact which is activated by the recloser mechanism. However, opposite interlock contact 52/b is in a opposite state from the interrupting contacts of the recloser. Handle contact 714 is a switch contact which is not activated by the recloser mechanism but is open by a handle mechanism which forces the recloser interrupting contacts open.

Figure 5A:
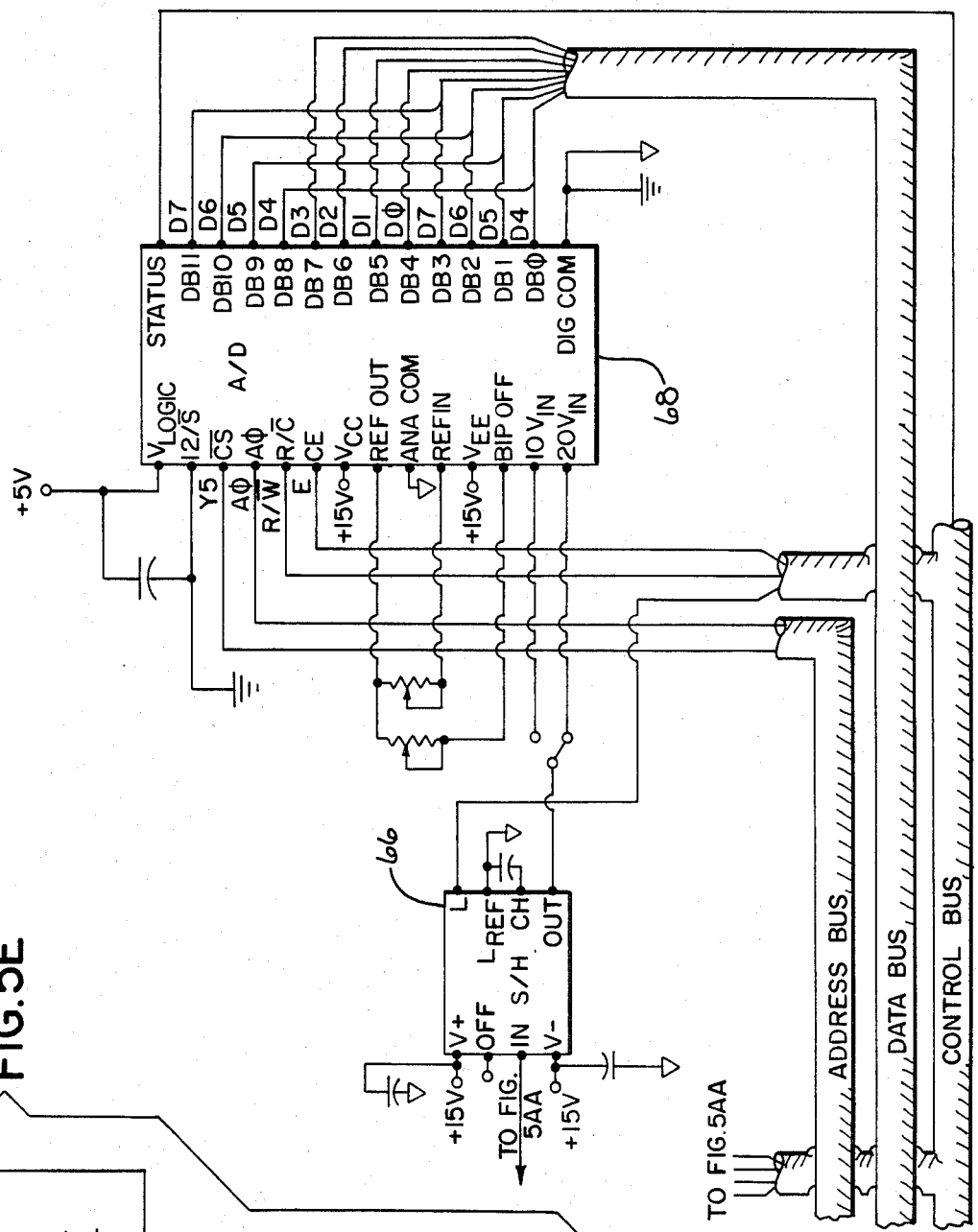
FIGS. 5AAA through 5H are a schematic diagram of the hardware components represented by FIG. 3.

When pistol grip switch 30 is thrown to the trip position, the trip coil 710 is energized, opening the reclosers interrupting contacts, and sending a trip control signal to the recloser interface board. As this is done, drag contact bar 708 opens the connection between its associated N and C contacts, which removes the close control signal going to the recloser interface board and the closed coil's 712 path to ground. As the recloser opens its interrupt contacts, opposite interlock contact 52/b closes. When pistol grip switch 30 is thrown to the close position, drag contact bar 708 makes connection between its associated N contact and C contact where it remains until pistol grip switch 30 is thrown to the trip position. Wiper 704 momentarily makes contact with its C contact issuing a pistol grip switch close signal to the recloser interface board. In a similar manner when pistol grip switch 30 is thrown to the trip position, wiper 704 sends a pistol grip switch trip signal to the recloser interface board. At any time when trip coil 710 is energized, a trip monitor signal is sent to the recloser interface board. Likewise, when close coil 712 is energized, a close monitor signal is sent to the recloser interface board. As shown in FIG. 5H, the signals which have a voltage associated with them in excess of the nominal 5 volt power supply voltage for the digital components for the microcomputer, are optically isolated.

Figure 3:
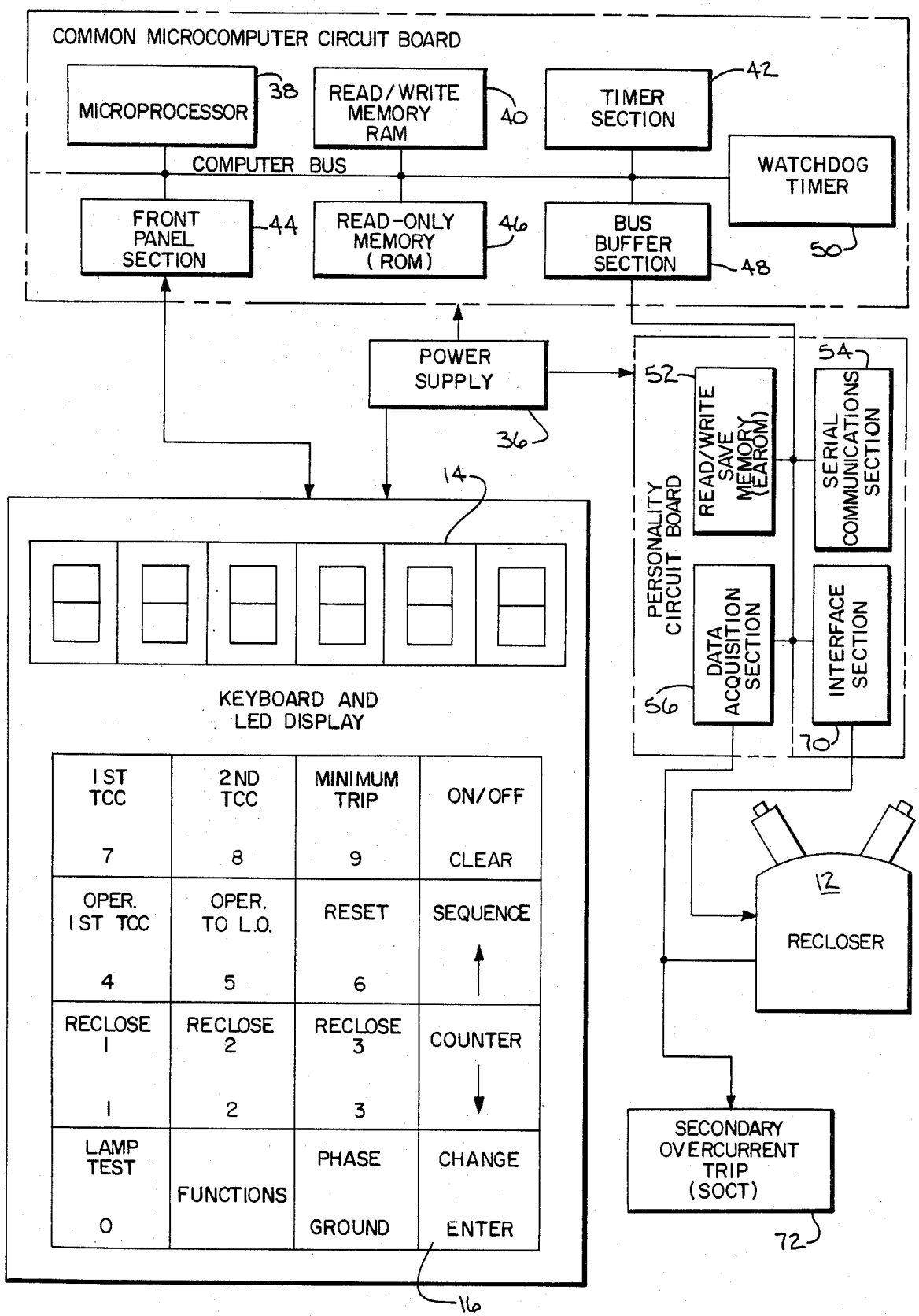
FIG. 3 is a block diagram of the generalized components of the present invention.

On keyboard 16, information which is more likely to be changed or desired to be displayed are directly labeled on the keys of the keyboard as shown in FIG. 3. These include a first and second time current characteristics, a minimum trip and an on/off key for the LED display 14. Also included are a number of operations on the first TCC, a number of operations to lock out, a reset interval to determine how long the number of trips stored in the trip counter will be maintained under normal conditions. Further included are a sequence indicator, and reclose times which determine the interval that the recloser will remain open. A counter key displays the total number of trips. A phase and ground key displays the characteristics of those respective phases. A functions key allows the entry of other command information. The functions key allows command information to be selected by a function code number.

FIG. 3 shows which hardware modules are used and how they would be configured for a generalized power system.

These modules are used in three different ways to implement a particular power system control. For example, a bus buffer module 48 is used in all controls with only minor modifications. Some modules would be combined to form a common microcomputer circuit board, the foundation for all controls. Finally, other modules are combined to form the "personality" circuit board, unique to each particular control. The personality circuit board provides among other things, the required input and output interfacing between the apparatus being controlled and the microcomputer. One of the most important functions of this interfacing is the protection of the input and output lines to prevent unwanted signals and electromagnetic interference (EMI) from affecting sensitive areas of the control causing false responses or damage to the circuit elements.

The Microprocessor Module 38 is the circuit element that performs the various arithmetic and logic functions of the control. This module is designed around one of the most powerful microprocessors available and is particularly suited to a power system control application. In particular, all the required logic circuits as well as capabilities for easy servicing are included.

The Read/Write Memory Module 40 is primarily for temporarily storing data. In a recloser, for example, this information would include line current magnitudes.

The front Panel Module 44 is used to interface the front panel light-emitting diode (LED) display 14 and membrane keyboard 16 to the microcomputer (see FIG. 1A). The mirocomputer eliminates the need for multiple switches and an inventory of plug in components by storing in semiconductor memory the control settings the user has selected. These selections are entered on a calculator-type keyboard 16. Interrogation of existing setting would be achieved by pressing a function key or entering a function code and observing the setting on the LED display 14 (FIG. 1A). Entry of new settings requires the operator to first enter a security code to verify that he is qualified to make such additions or modifications. Once the security code has been cleared, the user can then enter new settings.

Operation of the front panel is software controlled for maximum flexibility, particularly in the area of display characters. By using this module on all control designs, the layout and operation of the front panel remains similar.

Read-Only Memory Module 46 is preferably electrically programmable for easy modification and is used for storing programming information. In a recloser control, for example, this module contains command information including multiple time-current characteristic curves.

Buffer Modules 48 are used to extend the number of modules used in a particular control design. With the use of buffers, an almost unlimited number of modules could be configured in a control.

Figure 5E:
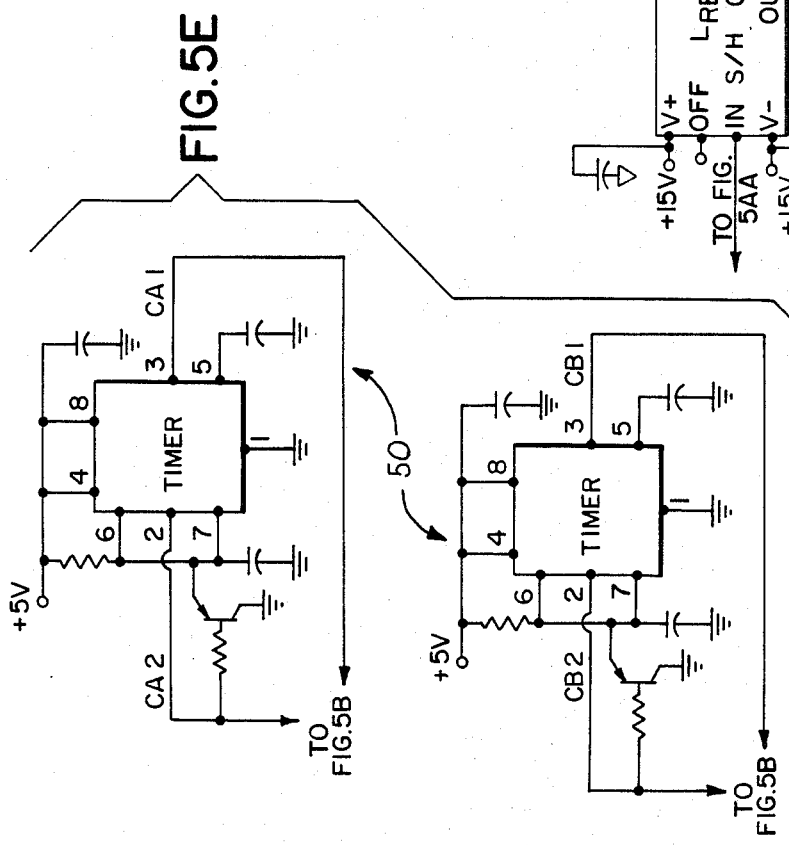
Figure 5A:
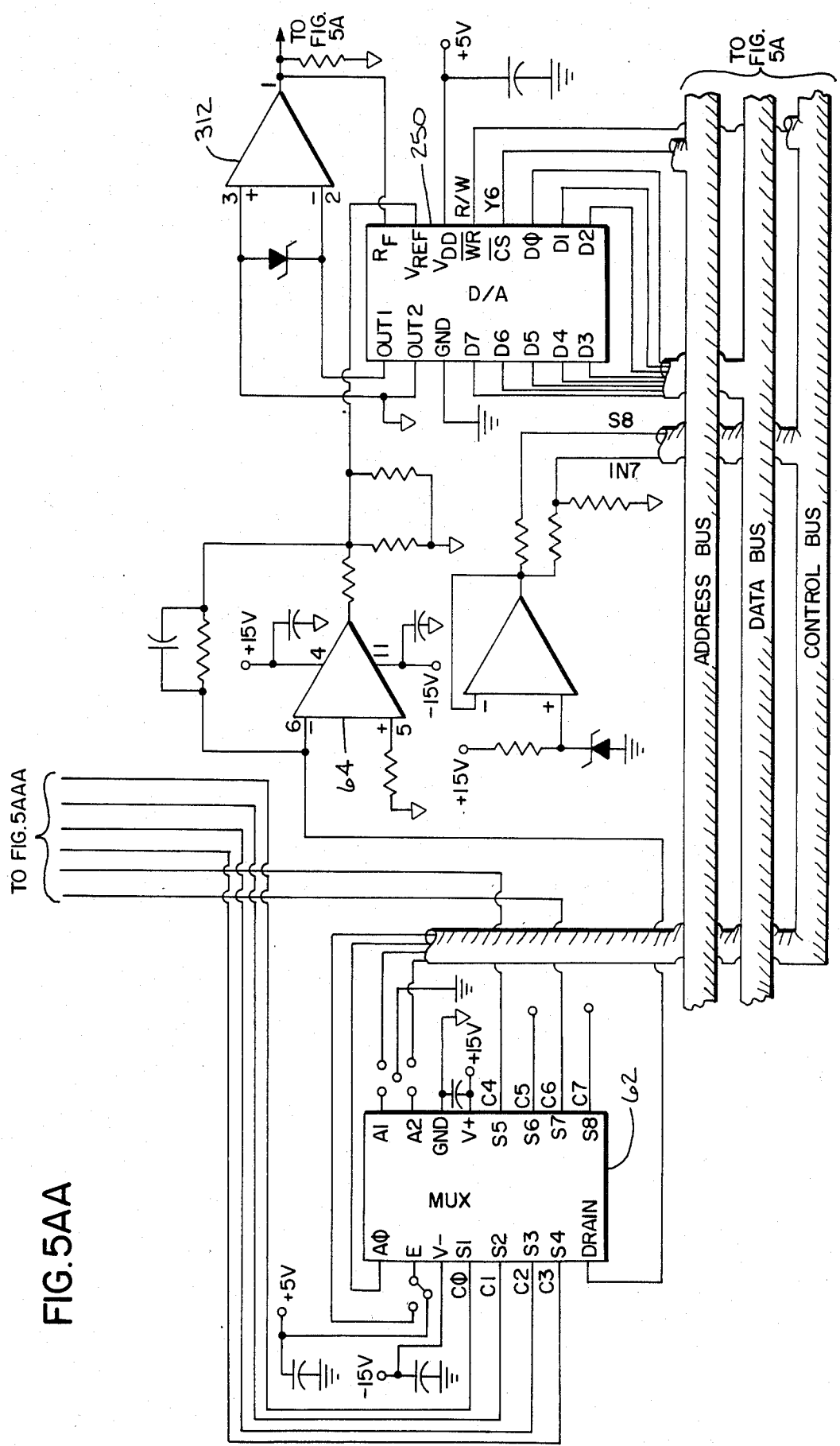
Figure 5B:
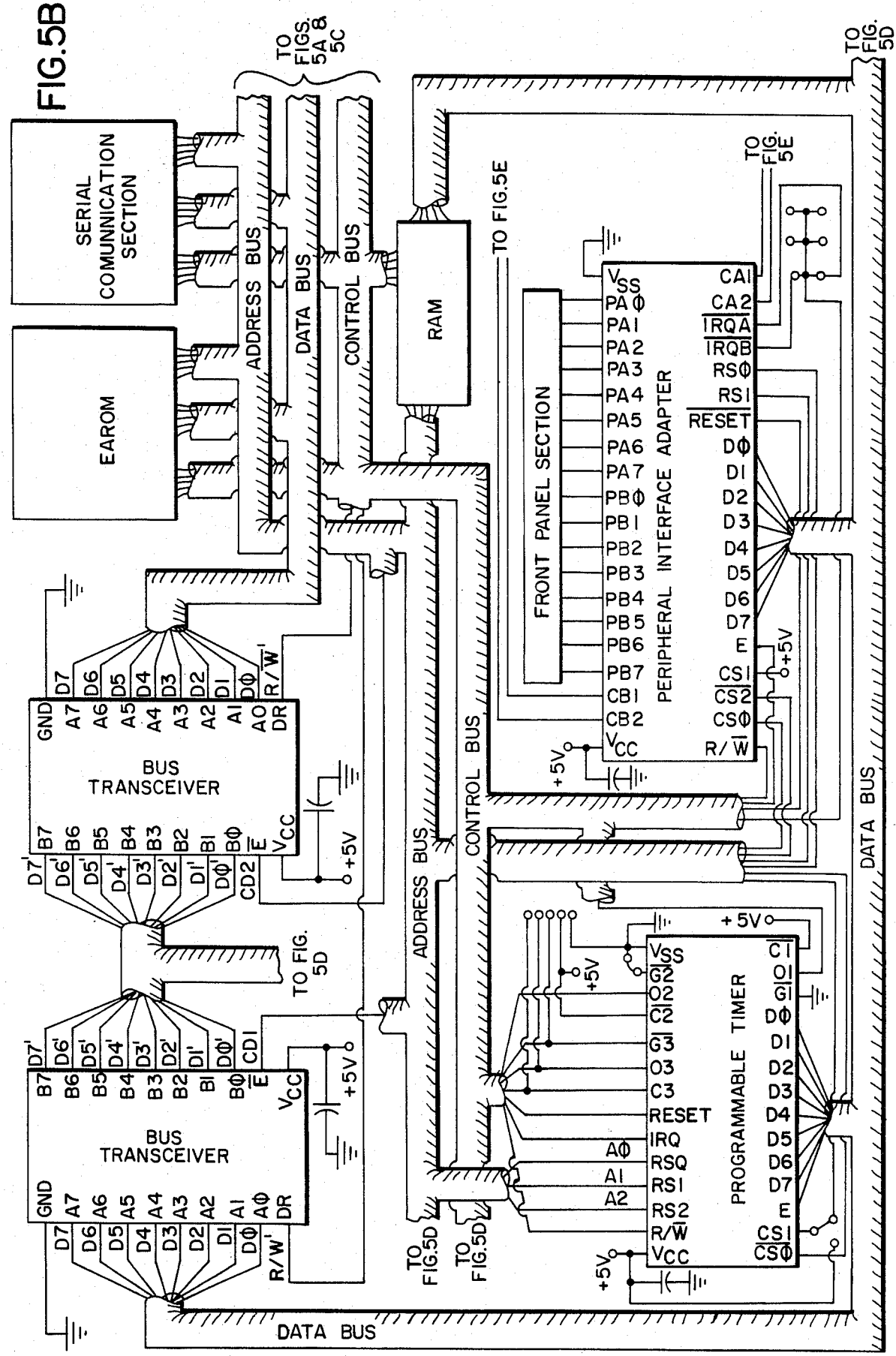

The Watch Dog Timer Module 50 is used to insure proper control operation even if the control were to suffer a temporary failure. The "Watch Dog" circuit would then interrupt the operation of the microcomputer to diagnose and correct the error. In particular the Watch Dog Timer Module 50 consists of a missing pulse detector which requires a steady stream of input pulses to prevent an output from being transmitted. In the event that the proper program flow is lost and the system is interrupted, the Watch Dog Timer would "time out" forcing the computer to be reset. As shown in FIG. 5E, the Watch Dog circuit comprises two resetable R-C timers which can interrupt the operation of the microcomputer if it is not regularly reset by the microcomputer. In effect, it serves to sense errors in software data transmission and when detected causes a restart program module as charted in FIG. 13.

The personality circuit board FIG. 3 includes the following.

The Read/Write/Save Memory Module 52 stores and retains data even without power. It is an electrically alterable non-volatile memory and no battery is required. This module is used for storing settings, security codes, serial numbers, historical data, abbreviated time current characteristics, normalizing references, instantaneous trip values, number of operations with a given time current characteristic, and time intervals for selected measurements and operations.

The Serial Communications Module 54 enables the microcomputer to communicate with other devices, as required in an automated distribution system, which allows the microcomputer to be remotely controlled.

Data acquisition section 56 acquires power system status information and monitors internal functions of the control. This is done in two modules.

One module provides the necessary power system status information to the microcomputer. In a power system control, this would generally include phase and ground current and voltage data. In the recloser control 10 which is the subject of this invention a data acquisition module includes the input circuit and data acquisition section shown in FIG. 2. The input circuit includes the resistors 58 and diodes 60 upstream of the data acquisition section. The diodes 60 clamp the inputs not being transmitted by the miltiplexer 62 below levels which would adversely affect the multiplexer 62. When an input is being transmitted it is effectively clamped to virtual ground. The data acquisition section first multiplexes the input signals under the control of the microprocessor 38 and programmable timer 42 then uses a summing amplifier 64 to take advantage of the virtual ground input conditions it causes. This data acquisition section then normalizes the input signal transmitted by the multiplexer 62 in accordance with a preselected normalizing reference which may be entered by an operator of the control. A sample and hold circuit 66 for sampling the output of the normalized input signal and maintaining them for a preselected period under the control of the programmable timer 42 so that it may be digitized by the analog to digital converter 68.

The microcomputer can instruct the second data acquisition module to "self-monitor" various internal functions of the control such as the battery and power supply status.

Figure 5C:
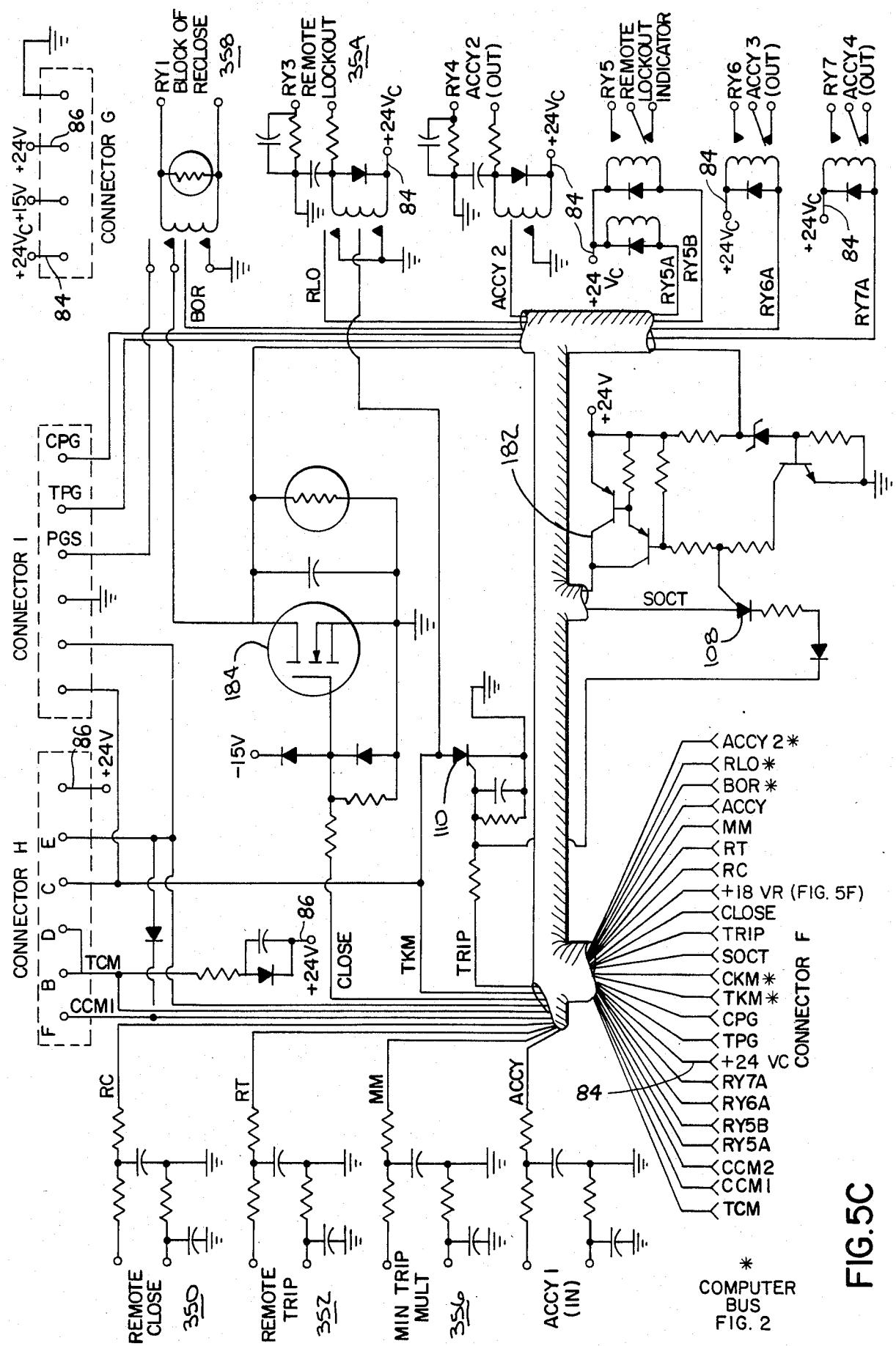
Figure 5D:
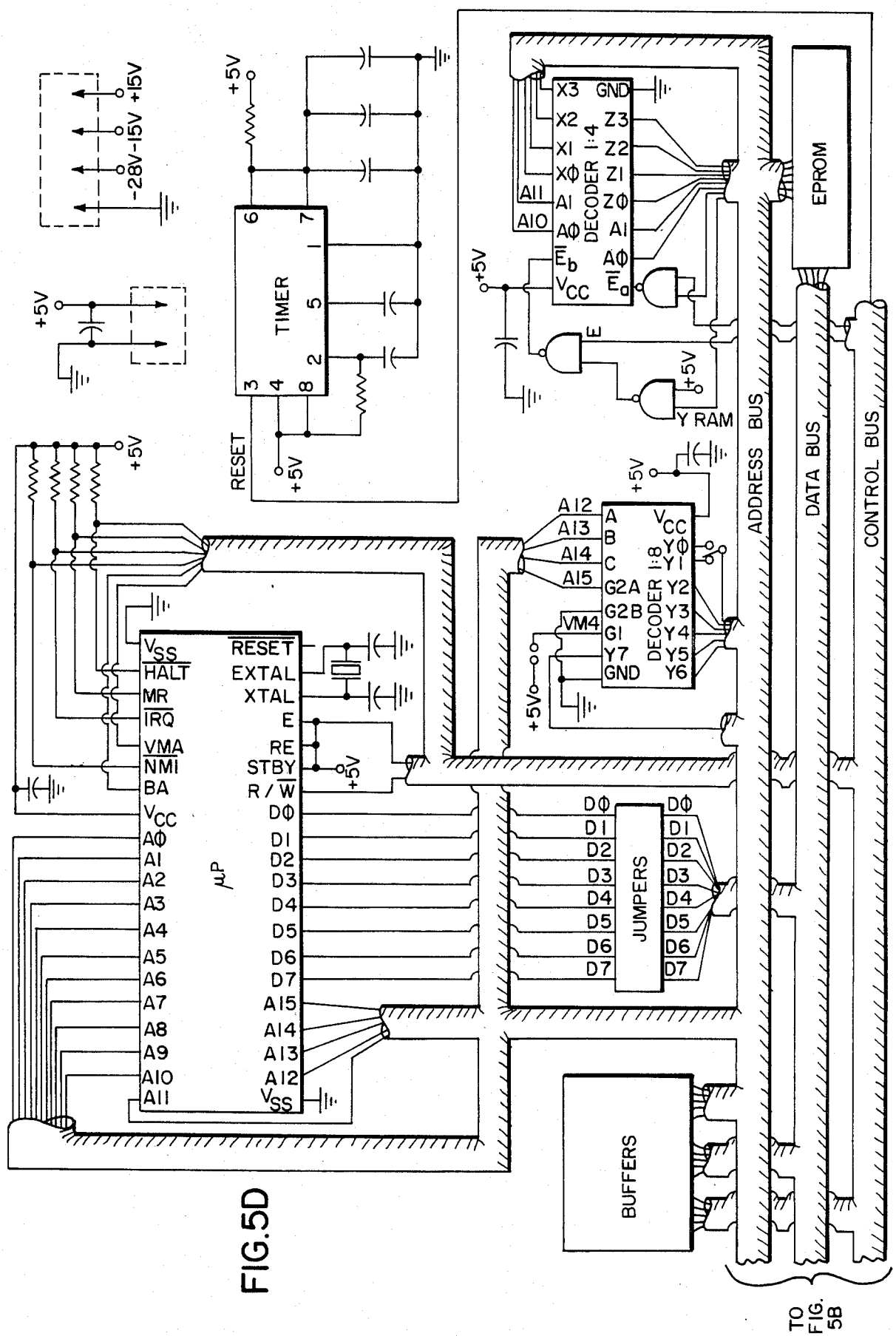

An Interface Module 70 is used to interface the microcomputer to other components of the control. In a recloser control, for example, the microcomputer requires inputs from the block of reclose switch 34, ground trip block switch 32, and other indicating devices and control inputs such as the pistol grip switch 30 on the panel of FIG. 1A. In addition, a recloser control must provide outputs to the trip coil circuit, close coil circuit, various annunciators, and others. Several control functions, including a recloser's remote close 350, trip 352, and lockout 354, remote minimum trip multiplier 356, and block of reclose 358, could be remotely activated by a user's relay contact or voltage signal as illustrated in FIG. 5C. Likewise, the control could supply status information to a remote location with relay contacts. Information conveyed in this manner could include indication of recloser contact positions, lockout and fault condition. Such capability makes the microcomputer based control adaptable to power system protection.

The personality circuit board of the recloser control also includes a secondary overcurrent trip circuit (SOCT) 72. This SOCT 72 continually receives input signals proportionate to currents in each of the three phases of the power line and ground as does the input circuit illustrated in FIG. 2. However, the SOCT 72 is not dependent on the reliable functioning of the microcomputer to perform its intended function of generating a trip signal. When any sensed current exceeds a fixed secondary time current characteristic, after a period of time in accordance with the characteristic, a trip signal is generated if the SOCT 72 is not disabled by the microcomputer. When the microcomputer initially receives power, or is in error condition, it can not reliably function to provide any protection for the power distribution lines. Under conditions of extended line outage where the later described power storage means are being exhausted the microcomputer can not be expected to reliably function. Under these conditions the SOCT 72 provides minimal protection to the protected power line and it is otherwise disabled by the microcomputer.

The Power Supply Module 36 provides power to the microcomputer and its associated components. In the case of Recloser Control 10, this module includes a 110 Volt AC power source 74, a trip capacitor 76 of sufficient size to trip the recloser, a rechargable nickel-cadmium battery 78, a DC-to-DC converter 80 and a power supply control 82 illustrated in FIG. 6 Trip capacitor 76 and battery 78 are power storage means. Upon temporary loss of the 120 Volt AC supply, such as might occur during fault conditions, the quiescent needs of the control would be supplied by the battery through the DC-to-DC converter 80. Under all but permanent fault conditions, this method provides an "uninterruptable" power supply for a period of time. Even under permanent fault conditions, with the use of the serial communication link, the microcomputer control preferably monitors its power supply 36 and the battery 78, and then transmits this status information to a central station so that immediate corrective action could be taken. As a last resort, if power were not restored in a reasonable length of time, the microcomputer would power itself down in order to conserve the battery 78. This, an orderly shut down of the microcomputer would occur before the battery 78 is completely discharged. Under these conditions the SOCT 72 is capable of tripping the recloser 12 with the trip capacitor 76 before the battery 78 is recharged to normal voltage.

Figure 16:
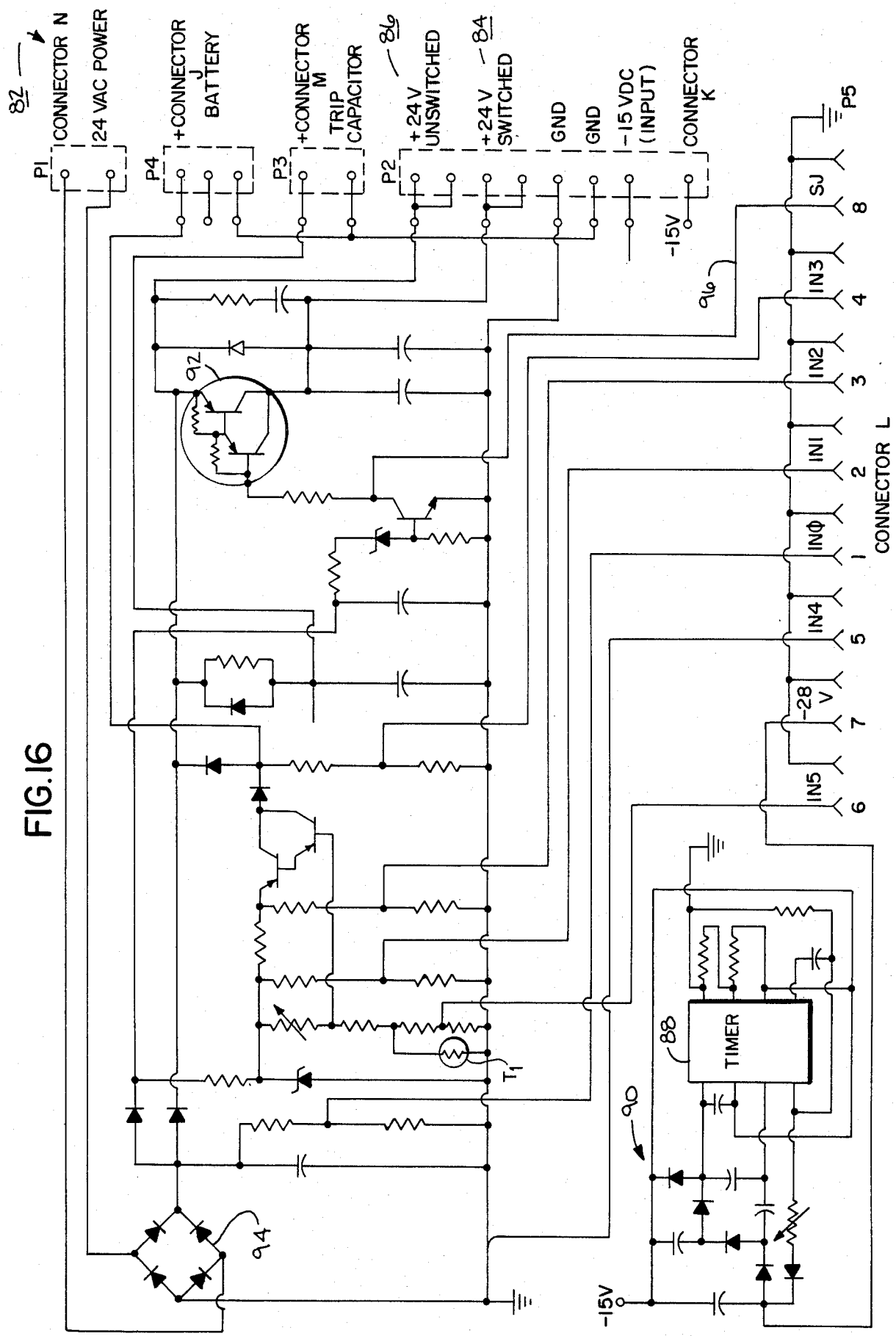
FIG. 16 is a schematic diagram of the power supply board.

The power supply control 82 portion of the power supply module 36 illustrated in FIG. 16 provides a means by which the microprocessor 38 may be powered down by means of switched 84 and unswitched 86 twenty four volt supplies. A negative 28 volt signal necessary to alter the Electrically Alterable Read Only Memory (EAROM) comprising the Read/Write/Save Module 52, is also supplied. The latter is provided by the circuitry shown in FIG. 16 employing a timer 88 leading into a voltage doubling network 90. The alteration of the EAROM 52 is under the control of the microprocessor 38 in response to commands from the input keyboard 16 and remote signals entered by means of the serial communications module 54 indicated in FIG. 3. The power supply control 82 (FIG. 16) is temperature by Thermistor T to charge the battery at its required rates which vary with ambient temperature. A switching transistor 92 of the power supply control is responsive to voltage at the output of the bridge 94 feeding the power supply control 82 and microprocessor generated signal 96. If voltage is present at the input bridge 94 the transistor 92 supplies 24 volts to components to which may be dispensed with during periods of extended power outage. If it is desired to shed these components the microprocessor may generate a signal 96 turning the switching transistor 92 off. This effectively turns the microprocessor 38 off and is done after the power down routines have been completed.

From the foregoing description it should be noted that this design approach allows one to develop an "instant schematic" for a control created by literally laying module schematics side by side like a jigsaw puzzle. Thus, new modules can be added to this system as technology advances or design requirements change.

Referring to FIG. 1A, the front panel is divided into an upper section and a lower section. The upper portion contains the keyboard 16 and display 14, the lower the controls for manual operation. Indicating lamps and a related switch that tests the lamps are also provided.

The upper part of the front panel includes: a six digit LED display 14; LED device status indicators; and a sixteen button keyboard. The LED display is used for displaying any desired information. The LED status indicators convey such information as recloser open 18, recloser closed 20, control lock out 22, above minimum trip 24, malfunction 26, and lock in 28. In a recloser the normalizing references, time current characteristics, instantaneous trip values, number of operations associated with a given time current characteristic, and time intervals for selected measurements and operations are all selected through the keyboard 16.

Through the use of the switches and keyboard mentioned above, all the operations of the device can be completely controlled by command information. Typical command information for a recloser control on the subject invention are first time current characteristics for phase and ground currents which usually result in the more rapid tripping of the recloser, and second time current characteristics for phase and ground currents which usually result in the controller remaining closed longer under fault conditions. Other command information includes minimum trip levels for phase and ground currents which in a recloser control begin the timing process in accordance with the time current characteristic, number of shots to lock out under phase and ground faults, and number of times which a given time current characteristic will be followed. Further command information is reset time interval which determines the duration which a counter recording the shot number will retain that information under non-fault conditions, multiple reclose intervals which determine the time that the recloser will remain open. Additional command information is a high current constant time feature which allows the recloser to remain closed only for a fixed duration under certain magnitudes of fault currents.

In addition, certain other parameters may be examined or changed using the keyboard: the position of the sequence counter; failure status in the control, recloser, or the occurrence of an over fault on the recloser which results in a lock in if current is not interrupted within six cycles of tripping; a trip counter which records the number of trip operations throughout the life of the controller; battery and charger status, and for remote status interrogation.

The microcomputer consists of three distinct circuit boards: the microcomputer Board; the display board; and the Personality Board as shown in FIG. 3. The common microcomputer circuit board is the hardware heart of the control. This board contains the microprocessor 38 and components closely related to its operation. The memory 46 that contains the operating system as well as the central program are located on this board. The display board plugs into the common microcomputer circuit board and contains the input keyboard 16 and output LED's to permit the operator to "communicate" with the control. The common microcomputer circuit board and the display board are common to all power controls and will be used on other power systems microcomputer based controls. The major items that change for other applications are the memories that carry the exact program for the required function, and the Personality Board.

The Personality Board is dedicated to the hardware functions unique to the specific control. This board has additional memory 52, the ability to receive analog signals and supply the common microcomputer circuit board with a digital format of these signals and the status of various relays and switches.

Figure 4A:
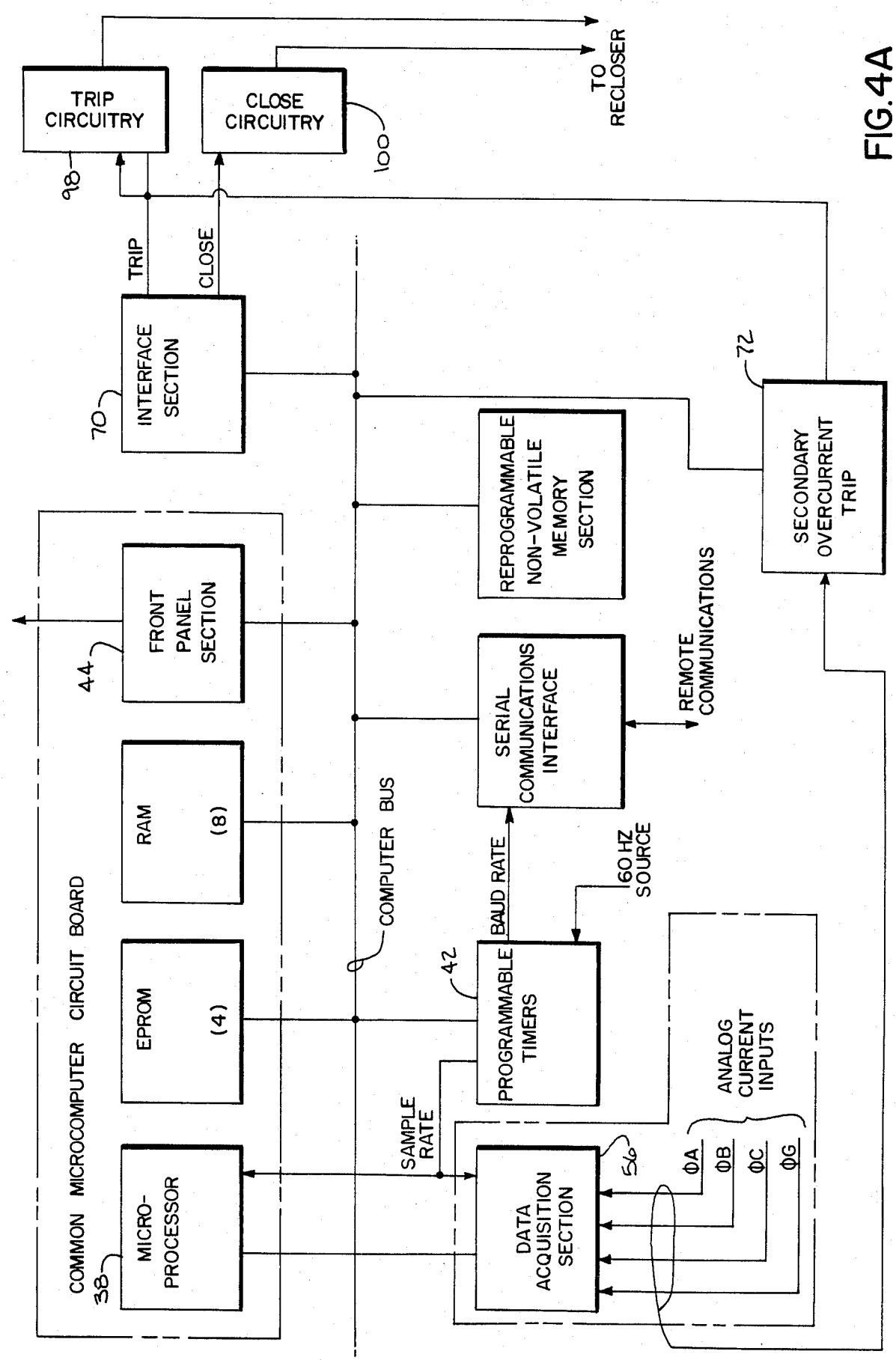
FIG. 4A is a block diagram of the microcomputer circuit board and personality board shown in FIG. 3.
Figure 4B:
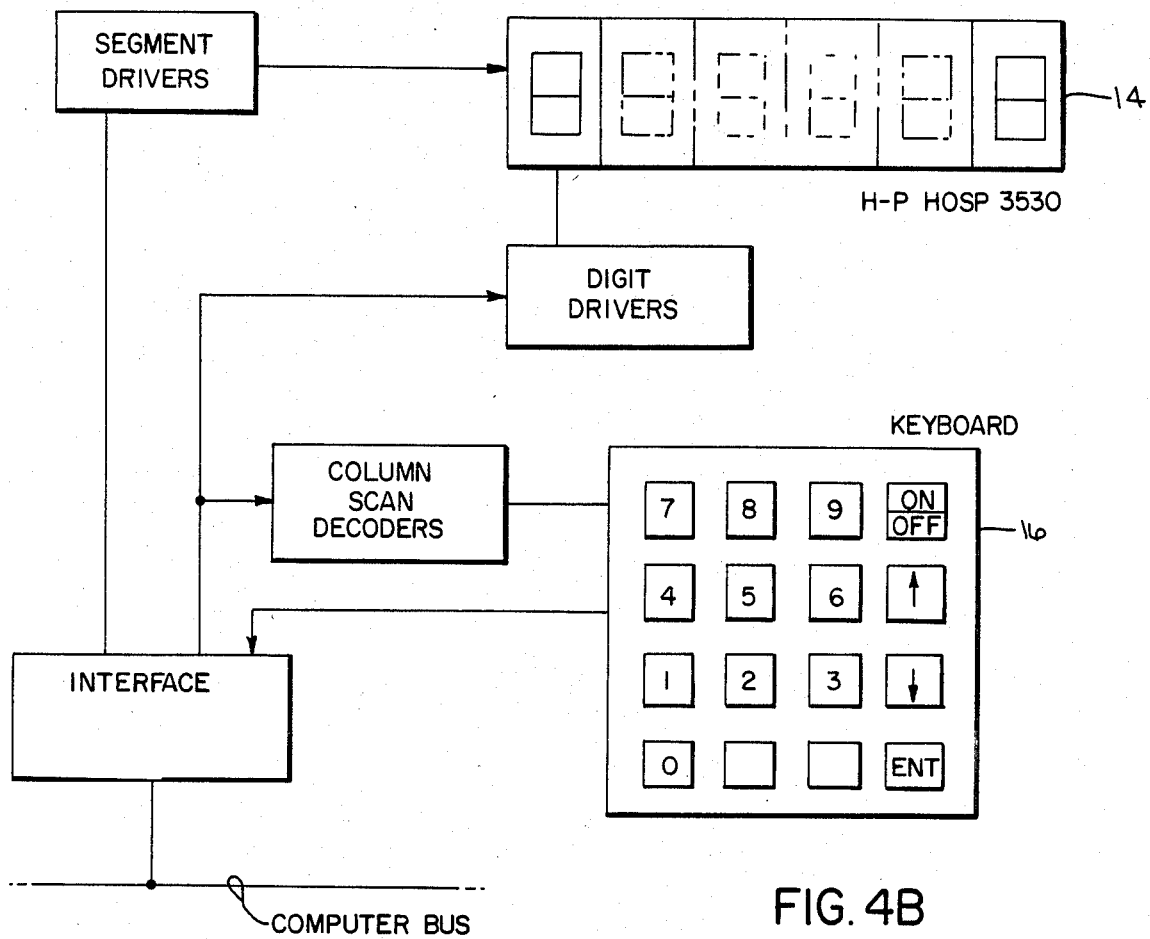
FIG. 4B is a block diagram of the keyboard and LED display board shown in FIG. 3.
Figure 4C:
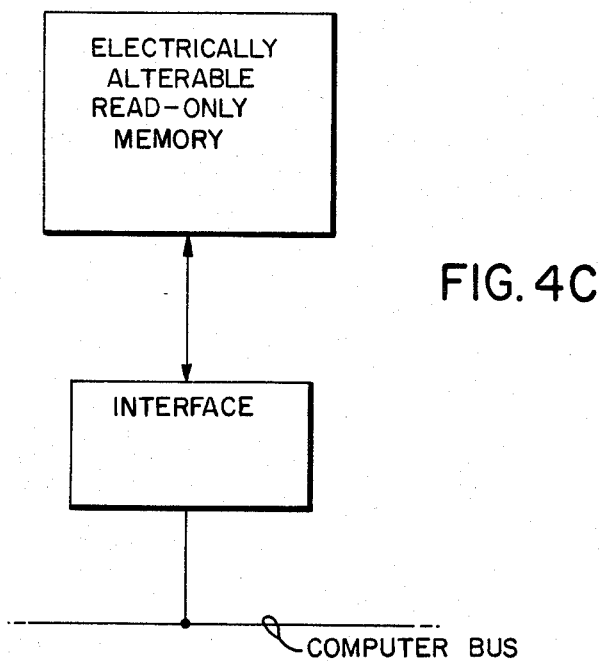
FIG. 4C is a block diagram of the non-volatile memory shown in FIG. 4A.
Figure 4D:
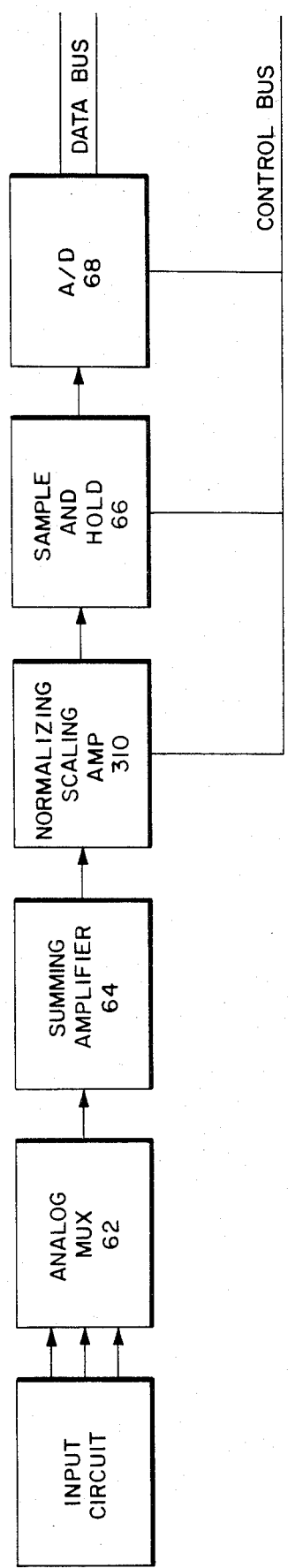
FIG. 4D is a block diagram of the data acquisition section shown in FIG. 4A.
Figure 15:
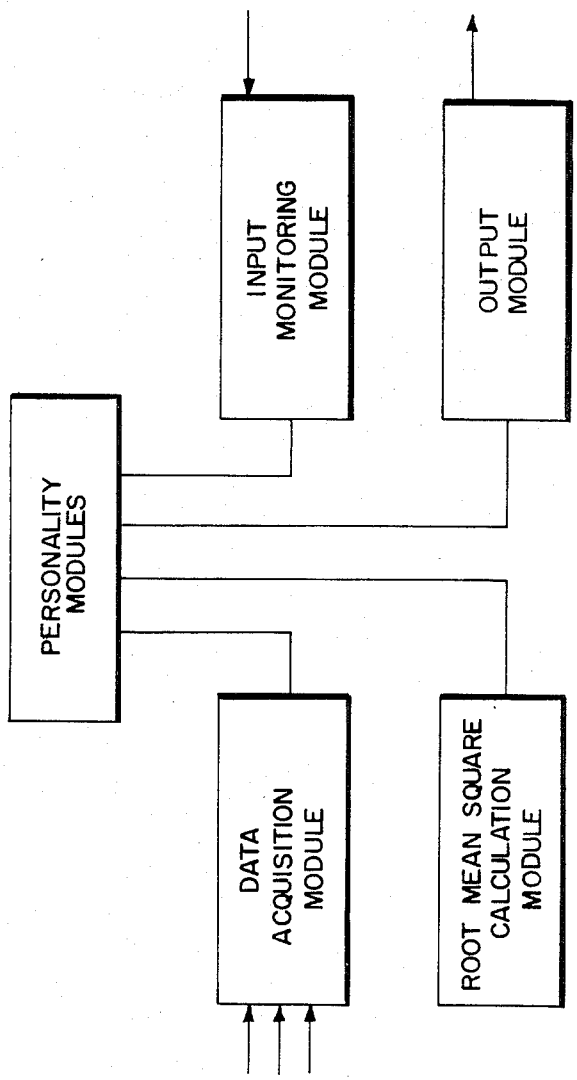
FIG. 15 is an expansion of the personality module shown in FIG. 12.

The principle components of the personality board are illustrated outside the common microcomputer circuit board in the block diagrams of FIG. 4A and FIG. 4D except for the trip 98 and close 100 circuits. The resistor 58 diode 60 circuitry shown in FIG. 5 AAA leading to the multiplexer 62 protect the multiplexer 62 and other low power devices from input levels which could cause them to fail or produce erroneous results. This protection is particularly important on an input when the multiplexer is not transmitting its signal. It should be noted that C3 and C4 are both ground current input signals with C3 allowing precise sensing of lower values of ground current because of the lower value of its input resistor 102. The input resistors 104 to all other inputs have a value of 200K while input resistor's 102 value is only 20K.

Figure 5F:
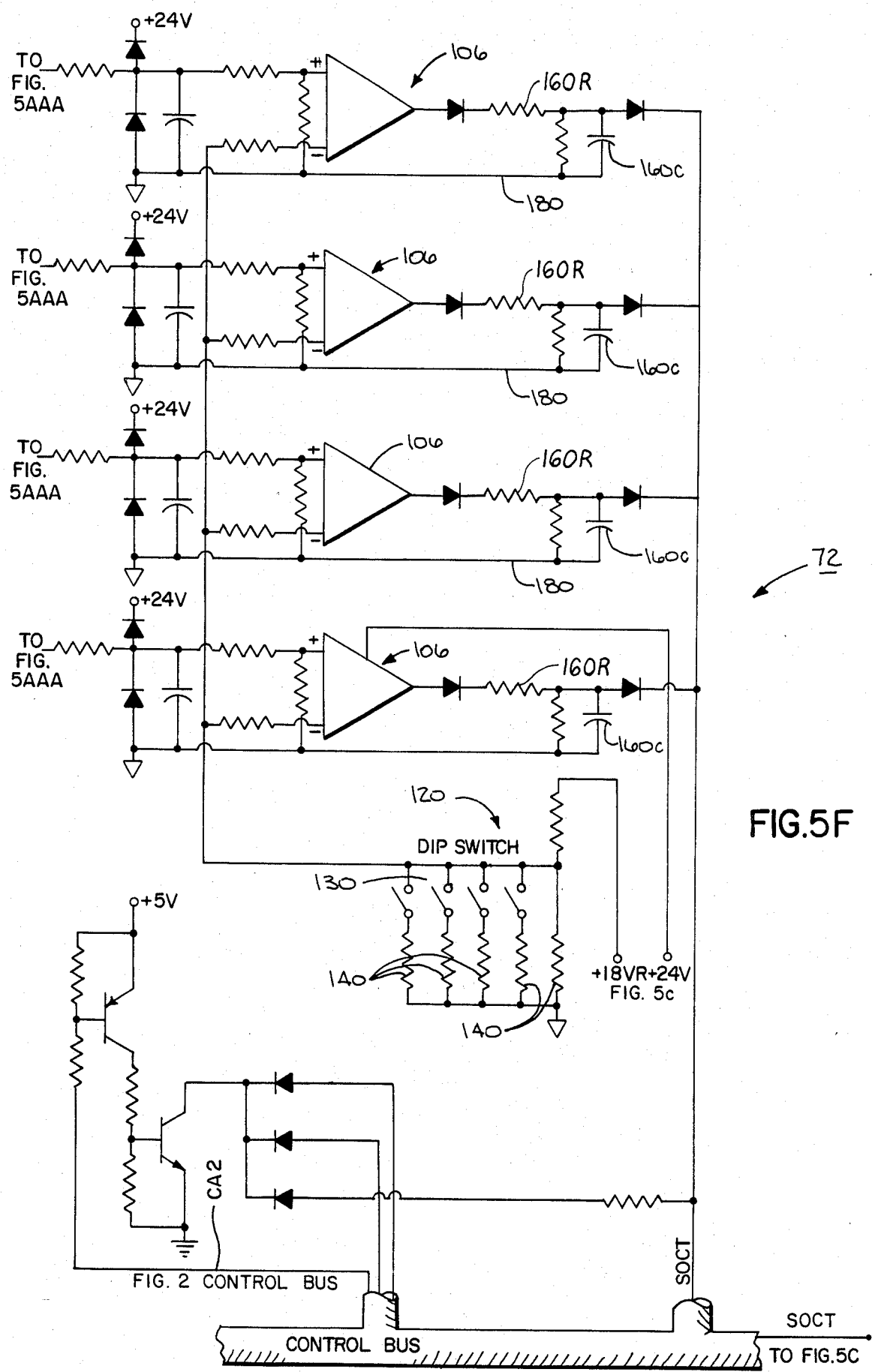
Figure 5G:
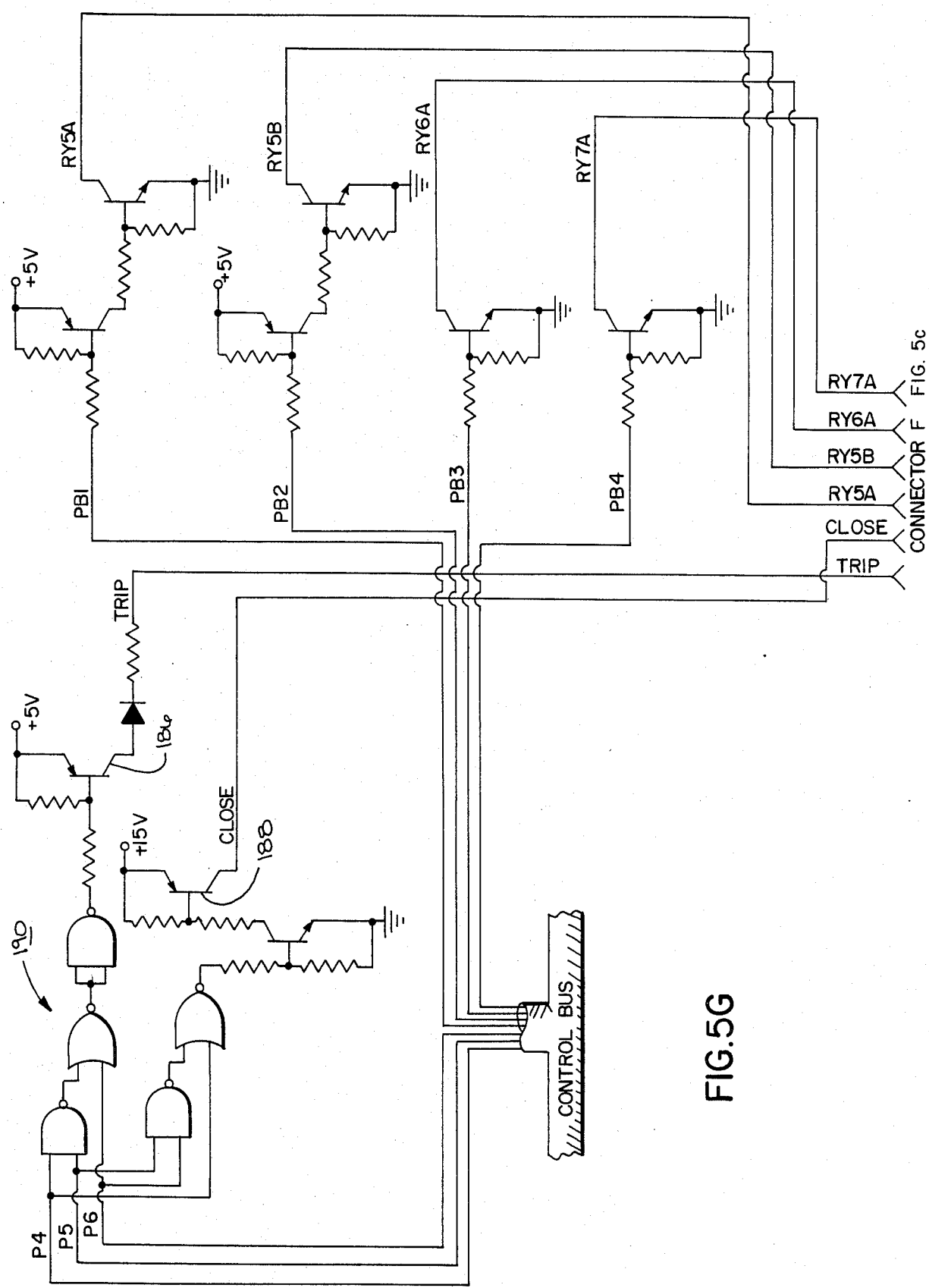

As shown in FIG. 5F the secondary overcurrent trip circuit 72 comprises four identical operational amplifier circuits 106 feeding a programmable unijunction transistor 108 (illustrated on FIG. 5C) which can cause the trip silicon control rectifier (SCR) 110 to conduct and energizing the trip coil which opens the recloser. The supply of current to the SCR 110 is broken by a recloser interlock which opens the circuit when a trip operation occurs. The inverting input to each is a voltage determined by a variable voltage divider 120 providing a minimum trip level. The voltage divider 120 is supplied 18 volts and is varied by closing appropriate connection on the dip switch 130 to insert shunting resistors 140. When the value of the voltage on the non-inverting input to an operational amplifier 150 rises above the negative input it begins to conduct and charges up the capacitor 160. If enough of the alternating current input signal going to the positive input of the operational amplifier 150 is above the non-inverting input, the amplifier 150 will cause the programmable unijunction transistor 108 to fire causing the SCR 110 to conduct. The RC network formed by 160R and 160C effectively provides a crude time characteristic. The ouput of the operational amplifiers in the SOCT 72 may be clamped to ground on computer command CA2. This occurs when the microprocessor is effectively operating. The programmable unijunction transistor 108 is also prevented from firing when the unswitched voltage (normally 24 volts) falls below 18 volts by a Darlington transistor array 182 and associated circuitry shown in FIG. 5C. This is done to prevent a trip attempt when the battery level is so low that the attempt may fail.

The redundancy features in the recloser control 10 are necessitated by its hostile environment and operate at many levels in both the software and the hardware. For example, in FIG. 5G redundancy features 190 are illustrated for the issuance of activating signals to both the power field effect transistor (FET) 184 controlling the close coil and the SCR 110 which controls the trip coil. The transistor 186 gating the trip SCR 110 can not conduct unless the negation of the product of : P4 and P5, and not P6 [(P4. P5. P6.)] from the microprocessor is satified. Similarly, the transistor 188 firing the power FET 184 controlling the closed coil will not conduct until the condition of: not P4, and P5 and P6 [(P4. P5. P6)] is satisfied.

The Personality Board also has optical isolation circuits to separate the microcomputer circuits from the higher voltage lines. FIG. 5H illustrates these isolators monitoring remote instructions, and crucial function of the recloser control. These include monitoring remote close 360, remote trip 363, minimum trip multiplier 364, accessory 366 and relays shown in FIG. 5C. Also monitored are the trip 368 and close 370 coils and their SCR 110 and FET 184 controllers in isolators 372 and 374.

Also mounted within the enclosure are the power supply control 82 (shown in FIG. 16), the DC-to-DC converter 80, and the recloser interface board. These major components and the 24 volt battery 78, the trip capacitor 76, the 110 volt transformer 74 supplying 24 volts to the power supply control 82 and the pistol grip switch 30 mounted on the front panel of the enclosure are all illustrated in the recloser control 10 wiring diagram shown in FIG. 6. The interface section 70 of the block diagram of FIG. 3 generally handles the higher power or voltage components of the recloser and relays, as well as potential inputs provided as desired by the user of the control.

Software Modules

The other major microcomputer design area is, of course, software. Two types of software are employed: an operating system, and an application program. A real-time operating system, MERTOS, was designed specifically for handling these activities in microcomputer based apparatus controls. MERTOS, is the software foundation of the modular approach to software design. MERTOS allows various independent tasks to be systematically incorporated into the control. This operating system is common to all of the microcomputer based power system controls.

Resident in the microcomputer is an executive program whose function is to supervise execution of the various subprograms within the microcomputer. These executive programs allocate the microcomputer resources among several subprograms to allow performance of computations and input/output in real time.

Figure 7:
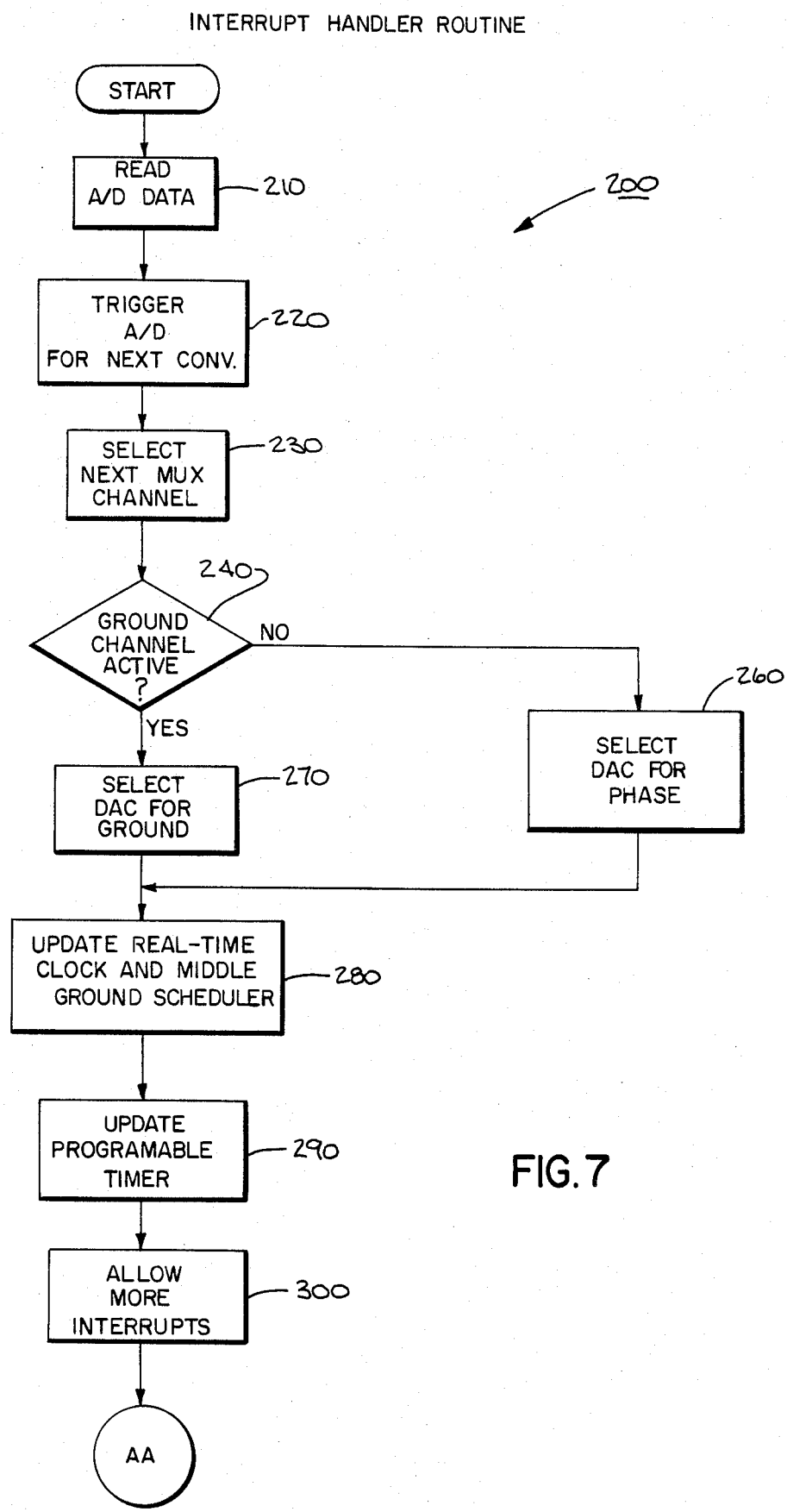
FIG. 7 is a flow chart of the interrupt handler routine.

The manner in which the executive program of the computer functions is illustrated in the flow charts beginning at FIG. 7 in which the blocks represent major functional components and other subprograms/tasks which are called upon by the executive program.

Upon power up or restart, the computer is directed through a bootstrapping operation which initializes read/write memories (e.g. RAM and shared memories), defines parameters unique to the electrical apparatus or control, and initializes the various registers of the data counters and registers (see FIG. 13). Once the computer is bootstrapped into an operating condition interrupts are allowed to occur and are serviced by the interrupt handler (see FIG. 7).

Interrupts are serial inputs that the central processing unit examines as part of each instruction cycle.

Figure 8:
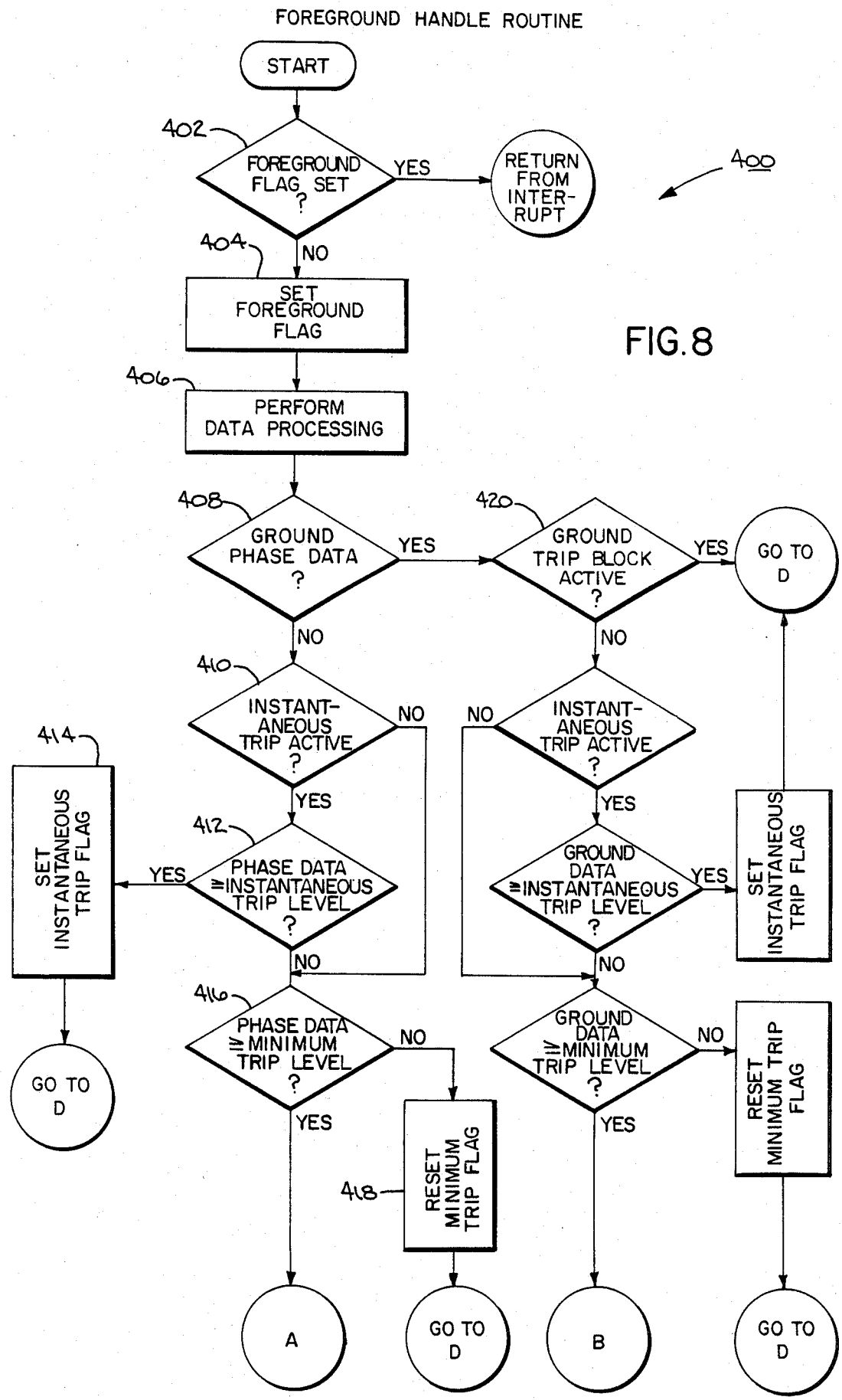
FIGS. 8, 9 and 10 is a flow chart for the recloser foreground routine.

An interrupt handler flow chart 200 is set forth in FIG. 7. The data stored in the analog to digital converter 68, shown in FIG. 4D, is first read, in read data block 210, and then the analog to digital converter 68 is triggered, in trigger block 220, allowing the acquisition of data stored in the sample and hold 66. Next the multiplexer 62 appearing in FIG. 4D is instructed, in the select block 230 to transmit the next analog signal. In ground diamond 240, the program branches. If the ground channel is not active, the digital to analog converter 250 (FIG. 5AA) is set for phase data, in phase data block 260. If the ground channel is active it is set for ground data, in ground data block 270. Next, the real time clock and the middle ground scheduler are updated, in combined update block 280. Afterwhich the programmable timer is updated, in timer update block 290. After these update tasks are performed, the program goes to the foreground handler 400 in the more interrupt block 300, and the program turns to the foreground handler routine (FIG. 8). Under normal conditions when power is applied to the recloser control 10 and the microprocessor 38 is functioning normally as determined by the watch dog timer 50, this interrupt handler routine 200, has the highest priority of all programs. If watch dog timer 50 detects an error, a restart begins as shown in FIG. 13. Of course when the battery 78 is insufficient to allow normal operation of microprocessor 38 the SOCT 72 overrides all programs. The interrupt handler module 200 is the means by which microprocessor 38 acquires digitalized input data.

Figure 2:
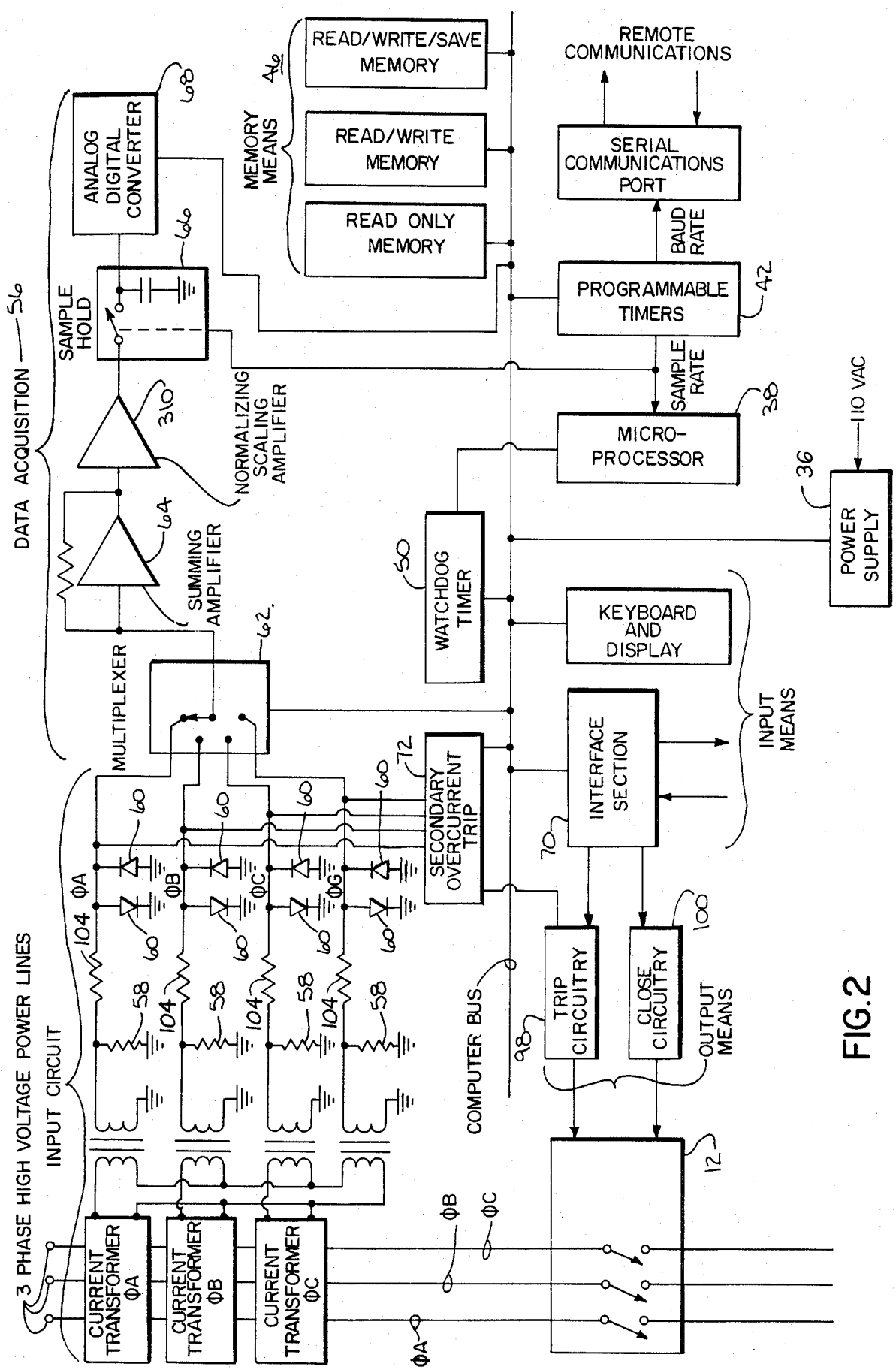
FIG. 2 is a block diagram of the more basic hardware components of the recloser control.

There are basically four signals to be sampled as shown in FIG. 2, if each input signal is sampled five times during a power cycle, a sufficiently accurate approximation proportionate to its RMS squared value can be computed by squaring each sample value and summing the most recent five squared samples. The sample interval is therefore 0.833 milliseconds and is governed by programmable timer 42 which is microprocessor controlled. The interrupt handler program 200 is run every 0.833 milliseconds to acquire these data samples. Each time the interrupt handler program 200 is run, digital to analog converter 250, shown in FIG. 5AA is appropriately set in blocks 260 and 270 of the interrupt handler program 200. Digital to analog converter 250 is a portion of the normalizing scaling amplifier 310 shown in FIG. 2. The remaining portion of normalizing scaling amplifier 310 is operational amplifier 312, also shown in FIG. 5AA. Digital to analog converter 250, varies the gain of operational amplifier 312 in response to signals issued by the microprocessor in blocks 260 and 270 of the interrupt handler routine to normalize the digitized data to arbitrary input data for ground and phase trip levels. This normalization of input data to a variety of preselected normalizing references result in considerable saving of hardware which would otherwise be needed to cover broad ranges of input data. Normalizing scaling amplifier 310, shown in FIG. 2, is the only amplifying component which is combined into one block from sheet 5AA.

These interrupts allow the CPU to react to events at the hardware level rather than at the surface level through checking staus bits (i.e. polling). Interrupts, although requiring more hardware than an ordinary programmed input/output, provide a faster and more direct response. In the MERTOS operating system, an interrupt handler 200 is provided which can differentiate between important and unimportant interrupts according to a priority interrupt system. According to the priority system, the CPU is not interrupted unless the priority of the interrupt is higher than the operation currently in effect.

After an interrupt has been cleared, the operating system supervises execution of subprograms according to a system of priorities. Each subprogram has associated with it a priority that indicates its importance relative to other subprograms to assist them and relative to interrupts from peripherial devices such as the keyboard.

Referring to FIG. 13 the first subprogram to be performed is the FOREGROUND subprogram. It represents the highest priority time-related task to be performed which are not otherwise executed by an interrupt signal. MIDDLEGROUND, identifies subprograms of lower priority than the FOREGROUND subprogram. The lowest priority subprograms are the BACKGROUND subprograms. The operating system in directing the operation of the CPU tests each of these subprogram's status and, if the subprogram has been interrupted, the CPU saves its condition at the moment the interrupt occurred. If the subprogram has not been interrupted, but instead has been completed, the CPU proceeds the next lowest level subprogram. Thus, each subprogram is completed, according to its priority structure, before the next subprogram is begun.

Figure 9:
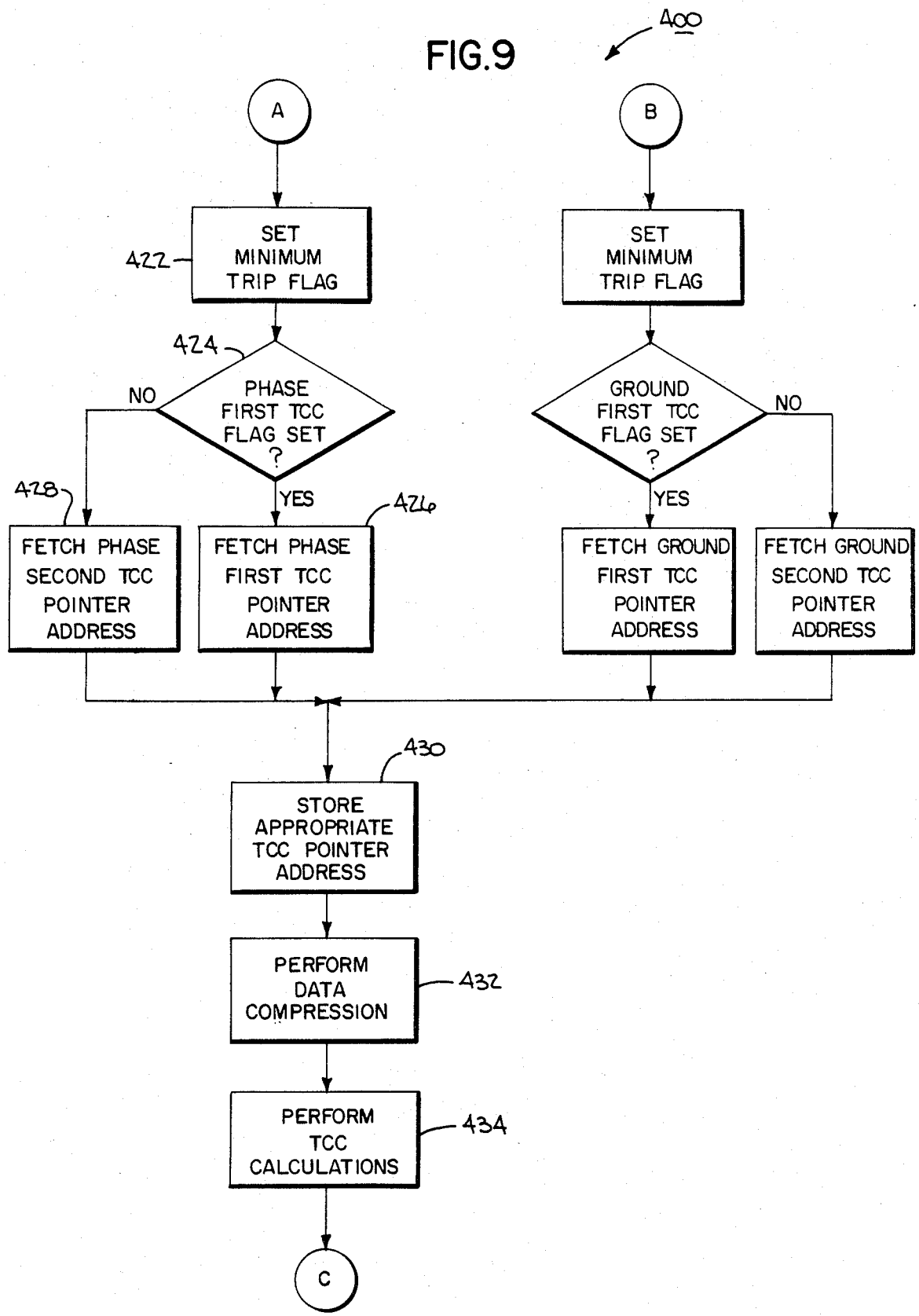
Figure 10:
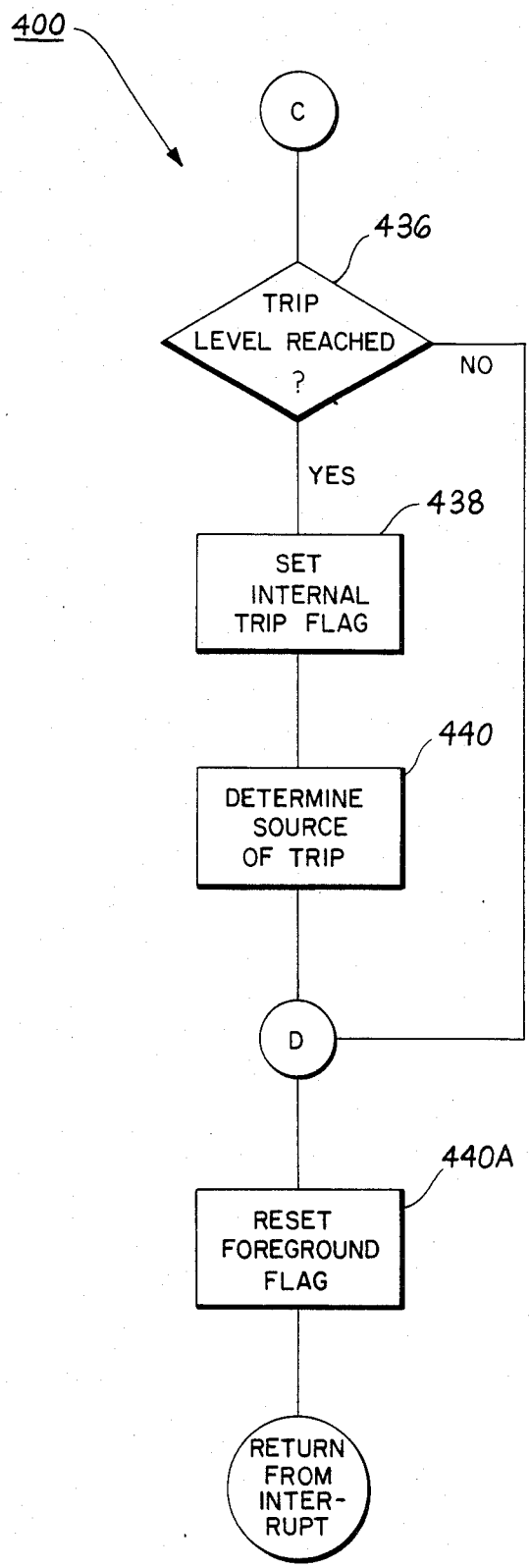

For example during FOREGROUND, the following tasks are performed as shown in FIGS. 8 through 10 in a flow chart for the foreground program 400. The foreground flag condition is examined in flag diamond 402. If the foreground flag is set, the program returns its previously interrupted state shown. If the foreground flag is not set, it is then set in flag block 404. In block 406, data processing is performed. While the program is in this stage, the squaring algorithm is performed to generate a value proportionate to the RMS value of the input signal. After this processing is performed, the data is examined to determine whether it is ground data, in ground decision diamond 408. If it is not, it must be phase data. If phase data, the determination as to whether an instantaneous trip activity is desired is determined in instantaneous trip diamond 410. If the instantaneous trip activity is desired, the data is examined, in instantaneous magnitude 412 diamond to determine if it exceeds the instantaneous trip level. If the instantaneous trip level is exceeded, the instantaneous trip flag is set in instantaneous flag block 414, and the program returns from interrupt. If the data does not exceed the instantaneous trip level, in the examination performed in the instantaneous magnitude 412 diamond, the data is examined, in minimum trip diamond 416, to see whether or not it exceeds the minimum trip level. If the instantaneous trip activity is not desired as is decided in instantaneous trip diamond 410, the data goes immediately to minimum trip diamond 416 to determine whether or not it exceeds the minimum trip level. If the data does not exceed the minimum trip level, in minimum trip diamond 416, the minimum trip flag is reset in minimum trip flag block 418 and the program returns from interrupt. If the data does exceed the minimum trip level, it passes through dummy point A. Returning to ground decision diamond 408 in this program, if the determination is that the data presented is ground data, it is conveyed to ground block diamond 420, where the determination of whether the ground trip block is active is made. If the ground trip block is active, the program returns from interrupt. From that point in ground block diamond 420, to dummy point B, the ground data undergoes similar processing to phase data previously described. Returning to phase data from dummy point A, following the determination that the phase data exceeds the minimum trip level, the minimum trip flag is set in minimum flag block 422. Next, the phase first time current flag is examined, in first TCC diamond 424. If the first TCC flag is set, the first phase TCC address enters the program with a fetch command, in first TCC address block 426. If the first TCC flag was not set, in first TCC flag diamond 424, then the address for the second phase TCC flag enters the program, in second TCC address block 428, by an execution of a fetch command. Next, the appropriate TCC address is stored, in address store block 430. Ground phase data is similarly treated between dummy point B and address store block 430. The data at this point is a relatively large number representing a value proportionate to the RMS of the input phase being examined. It is not necessary that the corresponding value of this RMS be known to perform time current characteristic calculations. Therefore, the data is compressed by selecting one of a number of ranges in data compression block 432. Next, the compressed data is used to perform time current characteristic calculations in TCC calculation block 434. After this step, the program passes through dummy point C. Thereafter the determination is made whether or not the trip level has been reached, in trip level diamond 436. If the trip level has not been reached, this foreground program 400 returns from interrupt. If the trip level has been reached, the program proceeds to set internal trip flag, in internal trip flag block 438. After which the source of the trip is determined in trip source block 440 and foreground program 400 returns from interrupt.

Figure 11:
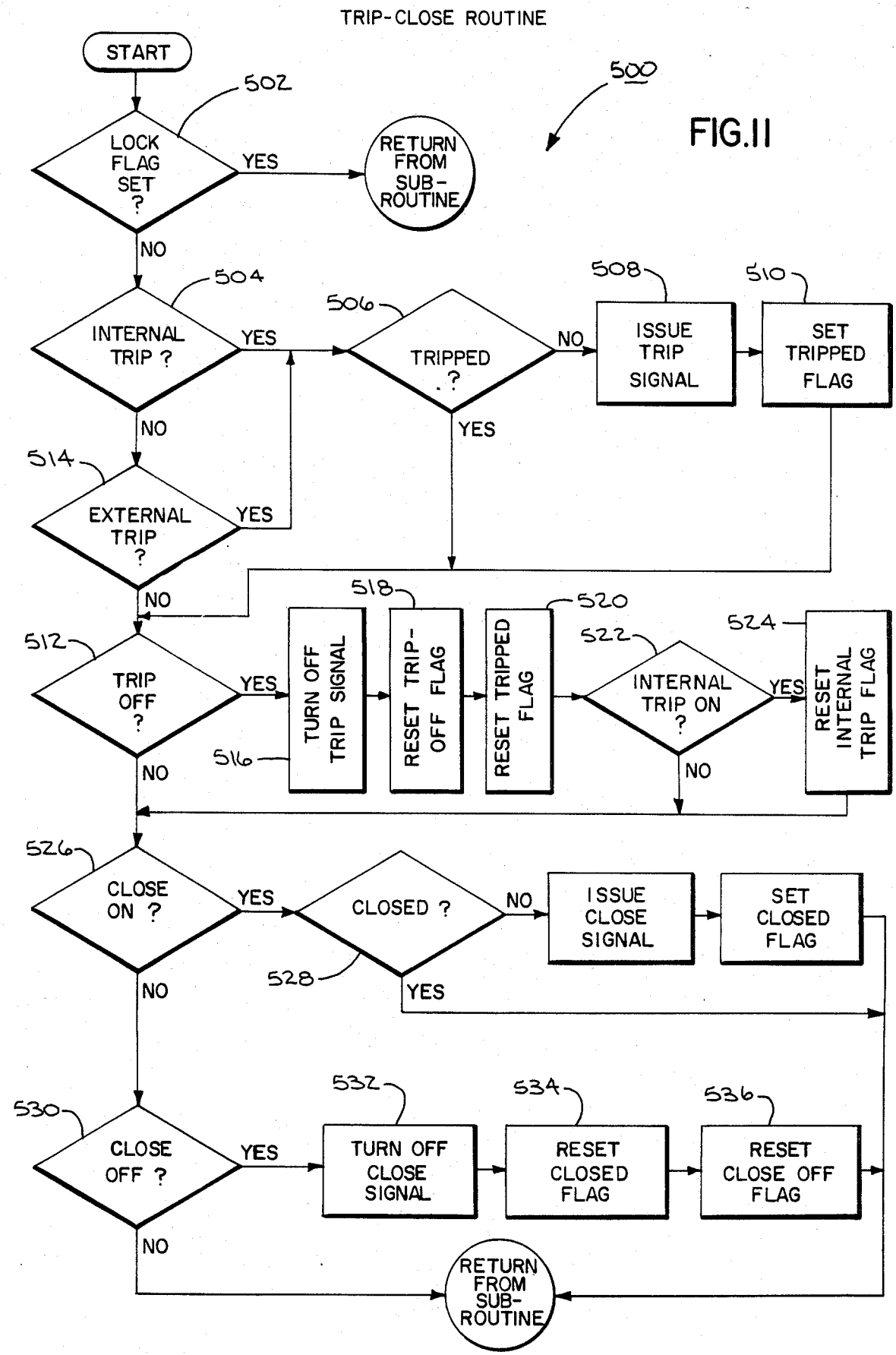
FIG. 11 is a flow chart for the trip close routine.

When the microprocesor 38 issues a trip or close flag of any type, the trip close routine 500 illustrated in a flow chart in FIG. 11 is run. First the lock flag is examined to see whether or not it is set, in lock flag diamond 502. If the lock flag is set, the trip close program 500 returns from subroutine. If the lock flag is not set, the data is examined, in internal trip diamond 504, to see if an internal trip exists. If an internal trip does exist the condition of the recloser is examined in the trip diamond 506. If the recloser is not tripped, a trip signal is issued, in issue trip block 508, and next the tripped flag is set in trip flag set block 510. After which, an examination is made as to whether or not trips are inhibited, in the trip off diamond 512. Returning to trip diamond 506, if the recloser has already been tripped the program proceeds immediately to trip off diamond 512. Returning to diamond 504, if the source of the trip or close signal is not an internal trip, a determination is made, in external trip diamond 514, whether or not an external trip exists. If it does, the program enters trip diamond 506 and proceeds as if an internal trip did exist. In the event that an external trip does not exist, in external diamond 514, the program proceeds to trip off diamond 512. In the trip off diamond 512, it is examined to see whether or not a trip off flag is set. If it is, the trip signal is turned off, in trip turn off block 516. Next, the trip off flag is reset, in reset trip off block 518. Following this, the tripped flag is reset, in reset tripped flag block 520. After this, a determination is made whether or not the internal trip is on, in internal trip on diamond 522. If it is, the internal trip flag is reset, in reset internal trip flag block 524. Following this, a flag is examined to determined whether or not a close on exists in close on diamond 526. If an internal trip on does not exist in internal trip, in diamond 522, the program proceeds immediately to close on diamond 526. If trip off does not exist in trip off diamond 512, the program proceeds immediately to close on diamond 526. If close on does exist, in close on diamond 526, the condition of the recloser is next examined, in closed diamond 528. Here the program follows a similar routine to that followed between trip diamond 506 and the trip off diamond 512. However, at the completion of this branch, trip close routine 500 returns from subroutine. If close on does not exist in close on diamond 526, the program proceeds to determine whether or not close off exists, in close off diamond 530. If close off does exist, the close signal is turned off, in turn off close signal block 532. Following this, the closed flag is reset, in reset closed flag block 534. Next the close off flag is reset, in reset close off flag block 536 and trip close routine 500 returns from subroutine. If the close off does not exist in close off diamond 530, trip close routine 500 returns from subroutine.

Figure 14A:
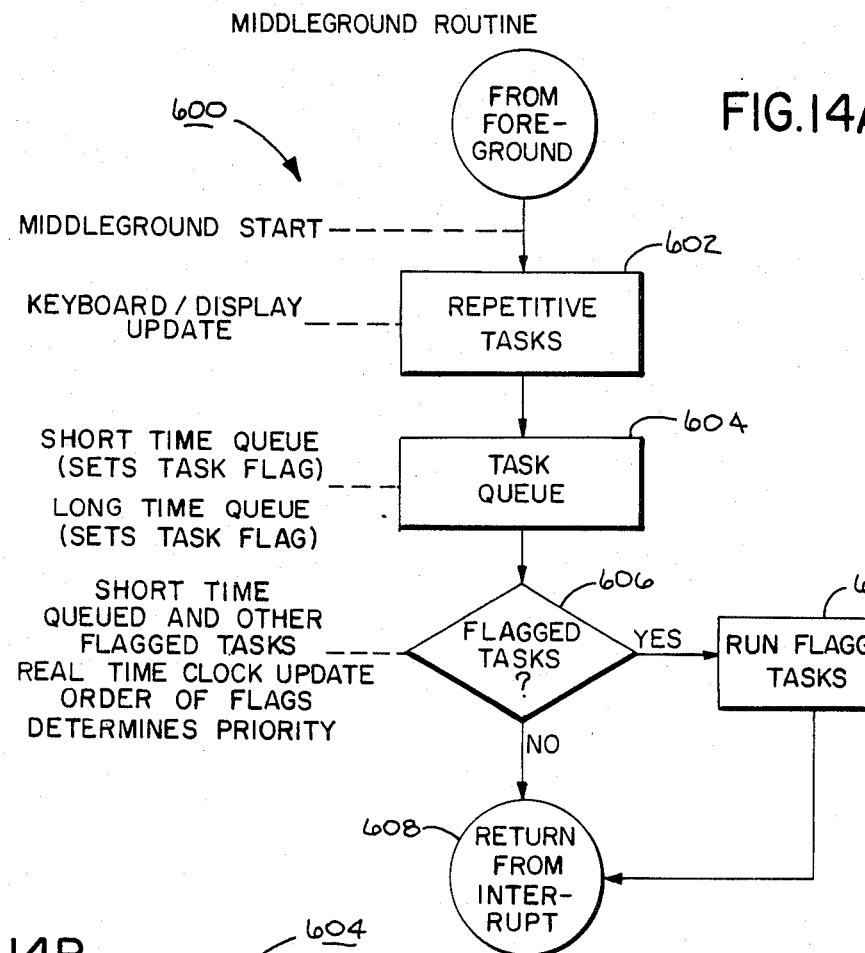
FIG. 14A is a flow chart of the middle ground routine contained within many modules shown in FIG. 12.

Middleground includes the performance of such routines as manipulating data, updating the digital display and accepting keyboard operations. An abbreviated flow chart of the middleground routine 600 is illustrated in FIG. 14A which continues the program from FIG. 13. In middleground the program first performs repetitive tasks, in repetitive task block 602. These tasks are all of equal priority and run in sequence once middleground routine 600 begins. The sequence order is not particularly important. Repetitive tasks in sequence order includes the following:

| NAME | TASK FUNCTION |
|---|---|
| PANEL | Panel scan |
| HIHO | Input/Output to include customer contacts in trip and close position of the recloser. |
| TCSP | Trip close status supervisor includes checking to see whether or not the recloser has interrupted a fault current following a trip command. If the recloser is not able to do so, it is locked in after six power cycles of fault current has been conducted after a trip operation. |
| DEAD | Times out LED display 14 if no entry is made on keyboard 16 for a given interval. |

The completion of all repetitive tasks, in repetitive task block 602, middleground program 600 enters into task queue block 604 where long and short time queue task flags are set. This function is further expanded in FIGS. 14B, 14C, and 14D. The dividing point between long and short times is approximately five minutes. If the task is to be run within five minutes or less, it enters the short time queue. If the task is to be run at a time greater than five minutes, it enters the long time queue. It is envisioned that the long time queue will be capable of accepting tasks to be run years after the task is entered. After middleground program 600 passes through the task queue block 604, a determination is made as to whether or not any flagged tasks exist in flag task diamond 606. In the event there are none, the program enters return from interrupt point 608 shown also in FIG. 13. If it is found that flagged tasks exist in flagged task diamond 606, they are run, in run flagged tasks block 610. An illustration of a generalized running flagged task is given in FIG. 14D.

Figure 14B:
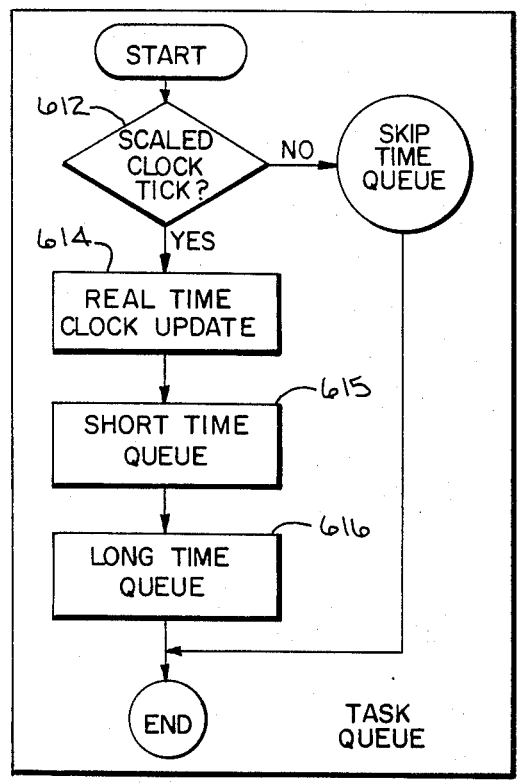
FIG. 14B is a flow chart for the orderly processing of information contained within the task queue block of FIG. 14A.

FIG. 14B expands task queue block 604 as shown in FIG. 14A. Initially the determination as to whether or not a scaled clock tick exists is made, in scaled clock tick diamond 612. If a scaled clock tick does not exist, the program immediately skips to its end and enters flagged task diamond 606. If a scaled clock tick does exist, the real time clock is updated in real time update block 614. Next, the short time queue is examined to see whether or not it is appropriate to run a task, in short time queue block 615. Following this, the long time queue is examined in a similar manner in long time queue block 616 and the program enters flagged tasks diamond 606.

Figure 14C:
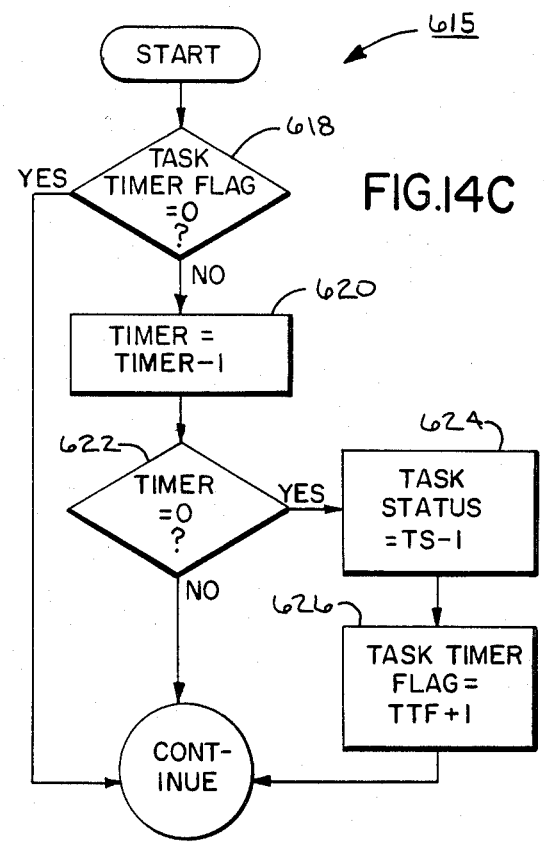
FIG. 14C is a flow chart expanding the short time queue block of FIG. 14B.
Figure 14D:
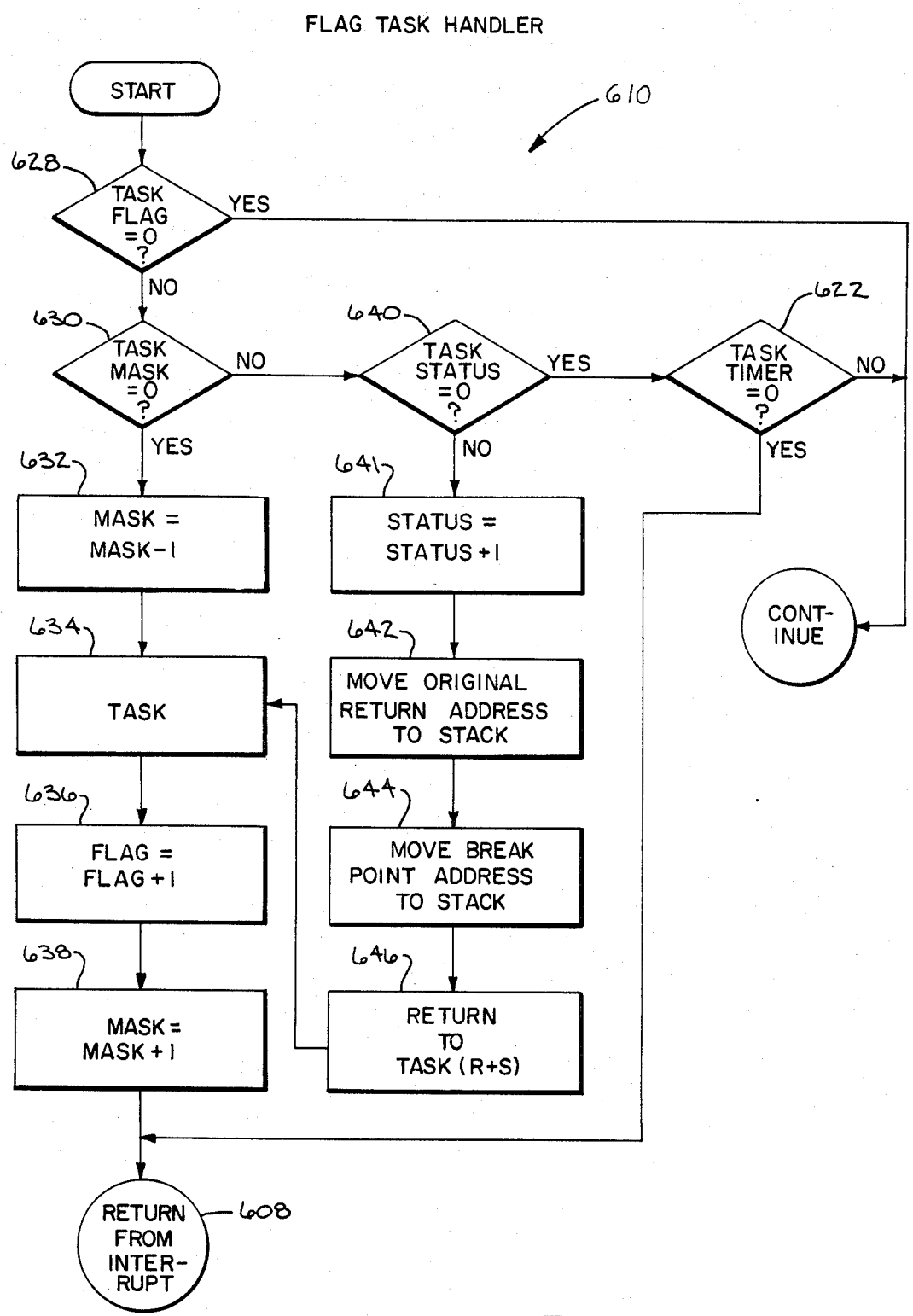
FIG. 14D is a flow chart for a generalized task flagged expanding the run flagged tasks block of FIG. 14A.

FIG. 14C expands the short time queue block 615 contained in FIG. 14B. A similar program, not shown exists for the long time queue. One of these programs exists for each flagged task. In short time queue block 615, expanded in FIG. 14C, the decision is first made as to whether or not the task timer flag is equal to zero, in time equal to zero block 618. If the flag is equal to zero, the program skips to some other task by entering into the continue point. A continue point exists for each flagged task. It essentially is an entry into the start of each flagged task program. The generalized flagged task program is illustrated in FIG. 14D. All flagged tasks are contained within the run flagged tasks block 610 of FIG. 14A. If the task timer flag equals zero does not exist, short time queue program 615 continues by subtracting one from the timer, in timer minus one block 620. Following this, the timer is examined to see whether or not it is equal to zero, in time equal zero block 622. If the timer is not equal to zero, the program continues to the next flag task. If the timer is equal to zero, in timer equal to zero block 622, one is subtracted from task status, in task status minus one block 624. Following this, the task timer flag is incremented by one in TFF plus one block labeled 626 and the short time queue continues, to run other flagged tasks contained within the short time queue block 615.

After the task queue subprograms are completed, flagged tasks are performed and run in flagged tasks block 610. The task status signal which is examined in flagged tasks diamond 606, ensures that flagged tasks are performed unless they are masked, and a task timer is examined in timer equals zero diamond 622 serves to control the time priority assignment of the tasks.

The generalized task run program is illustrated in FIG. 14D. First, the task flag is examined to see whether or not it is equal to zero, in task flag equal zero diamond 628. If the task flag is equal to zero, the program continues to additional tasks. If the task flag is not equal to zero, the task mask is next examined to see whether it is equal to zero, in task mask equal to zero diamond 630. If the task mask is equal to zero, one is subtracted from the mask, in mask minus one block 632. After this step, the specific task program is run, in task block 634. Following the running of the task, one is added to the flag in flag plus one block 636, and one is added to the mask, in mask plus one block 638. Following this, the program re-enters return from interrupt point 608 shown in this figure and FIG. 13. Returning to task mask equal to zero diamond 630, if the task is not equal to zero, the program branches and the task status is examined to see whether it is equal to zero, in task status equals zero diamond 640. If task status is equal to zero, the task timer is next examined to see whether it is equal to zero, in task time equal to zero diamond 622 which also appears in FIG. 14C. If the task timer is not equal to zero, the program continues where it runs additional task routines. If the task timer is equal to zero, the program returns from interrupt point 608 shown in this figure and in FIG. 13. Returning to task status equals zero diamond 640, if the task status is not equal to zero, one is added to status, in status plus one block 641. Following this, the return address is moved to the stack, in original to stack block 642. Following this, the break point address is also moved to the stack, in break point address stack 644. Once this is done, the program may return to running the task which has been interrupted, in return to task block 646.

MERTOS itself consists of a number of modules to allow for ease of maintenance. In this case, a module refers to a program, or series of instructions, which causes the microcomputer to perform a particular task.

The description of the hardware and software modules, is predecated on using a Motorola 6800 family microprocessor and devices compatible with it. It should be understood that other equivalent microprocessors could be used to the same effect. Each manufacturers family requires that the peculiarities of their devices be satisfied and in the microcomputer portion of the recloser control, it would be impossible to go into sufficient detail to describe the functioning control and be sufficiently general to adequately describe the use of alternative devices. One skilled in the art could readily amplify and modify the description given to make them applicable to the devices of other manufacturers by reading the normal technical literature provided by the manufacturer of another device. It would be extremely confusing to attempt to describe all the minor detail contained within the software and only the more general software modules and programs are described since one skilled in the art could readily flesh out the skeleton provided.

Figure 12:
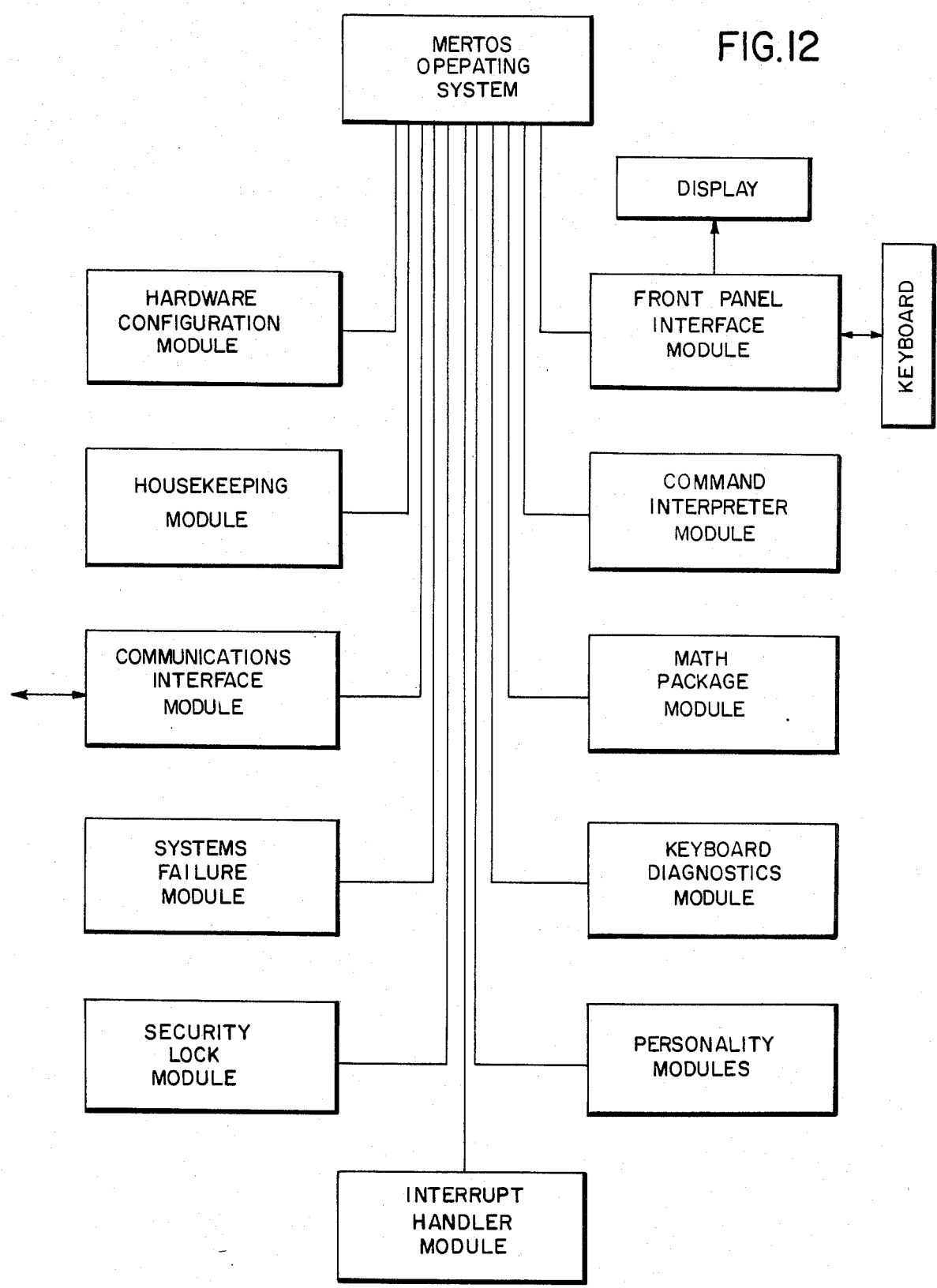
FIG. 12 illustrates the various software modules of programs employed to process information and depicting the various software modules forming the MERTOS operating system.

FIG. 12 illustrates MERTOS software modules including:

The Hardware Configuration Module is used to bridge the gap between the software and hardware in the microcomputer system.

The Housekeeping Module provides an orderly startup of the microcomputer system after power is first applied.

The Front Panel Interface Module is used to scan the front panel keyboard and to drive the LED display. After a key is pressed by the operator, the raw key information is decoded and passed to the Command Interpreter Module.

The Command Interpreter Module determines how the control responds to the various commands of an operator including examining and changing control settings, as well as displaying acquired data. Since this module is common, to all controls, once an operator has learned how to use one control, he would be familiar with all others. This module also processes remote-control commands, necessary for the incorporation of the control in an automated distribution system.

The Communications Interface Module provides the various communications protocols necessary to interface with other equipment, particularly in future automated distribution systems. Remote operation commands received by the control through a communications channel are translated and passed to the command interpreter.

Various faults that could occur in the microcomputer system under adverse conditions are detected and corrected by the System Failure Module. Included are various software "traps" preventing execution of erroneous operations. This is the software equivalent to the Watch Dog Module.

The Keyboard Dignostics Module provides front panel access of individual microcomputer components, allowing a service technician to examine various portions of hardware or software. Such programs can test the keyboard, the L.E.D. displays, the various I/O ports, the memory modules, the power supply and more. These types of tests would normally be used "on site" to test suspect controls or as part of a maintenance program to routinely check all controls.

Various functions of a control can be classified according to security levels, blocking their use by unauthorized operators. The Security lock Module provides for this function. In particular, this module allows the operator to enter a pre-determined number of digits as a security code. Each valid security code allows a set of functions to be performed. Each invalid security code produces an error message. Many security codes can be provided, each corresponding to a different level of security. Providing for several levels of security allows functions to be inserted or performed by various levels of supervisory control.

Many special accessories, now available on existing conventional controls only through the installation of additional hardware, can be provided on a microcomputer based control through additional software. Few, if any, additional components would be required. On a recloser, for example, these features include instantaneous trip, instantaneous lockout, minimum trip multiplier, targets and sequence coordination. Because of the power of a microprocessor, some accessories not now realizeable on existing controls would be practical to implement. For a recloser this could include an event recorder, custom time-current characteristic curve generation through the front panel, under-frequency sensing and a digital "thermal demand" ammeter. The individual application modules can be readily modified or additional modules added to the total system at any time, even after the control is installed.

It should be understood that various modifications changes and variations may be made in the arrangement, operation, and details of construction of the mircoprocessor based recloser control disclosed herein, without departing from the spirit and scope of this invention.

We claim:

1. A recloser control comprising:
    an input circuit for sensing current in each of the three phases of a power line and ground, and providing an analog signal for each;
    a multiplexing circuit for selectively transmitting each of the analog input signals;
    a normalizing scaling amplifier for selectively normalizing each of the analog input signals selected by the multiplexer in accordance with a preselected normalizing reference selected from a plurality of normalizing references;
    a sample and hold circuit for sampling the analog output of the normalizing scaling amplifier and maintaining it for a desired preselected holding period;

an analog to digital converter for converting the analog output of the sample and hold circuit to a digital form;

memory means for storing command information in digitized form including normalizing references, time current characteristics, instantaneous trip values, number of operations associated with a given time current characteristic, time intervals for selected measurements and operations, and status information such as digitized current magnitudes;

processing means for generating an equivalent to a mean square value for each digitized normalized input signal, comparing the mean square equivalent values of the inputs with a preselected one of a number of time current characteristics stored in memory means in accordance with other command information stored in the memory means, and receiving and issuing operating signals including an operation command which causes the recloser to change its state between close and trip conditions;

a power supply for selectively supplying power to the other portions of the control from the power line being protected, said power supply including a storage means to supply power when the power lines being protected are interrupted;

a secondary overcurrent trip circuitry which continually receives input signals proportionate to currents in each of the three phases of a power line and ground for generating a trip signal when any sensed current exceeds a fixed secondary time current characteristic after a period of time in accordance with that time current characteristic, if not disabled by said processor means;

output means for activating trip means in the recloser in accordance with operation commands from the processor means or a trip signal from the secondary overcurrent trip circuitry, or close means in the recloser in accordance with operational commands from the processor means; and input means for entering command information.

2. A recloser control as claimed in claim 1 further comprising redundancy means which checks the status of at least three signals from said processing means before allowing activation of trip means or close means in said output means.

3. A recloser control as claimed in claim 2 wherein said redundancy means checks the status of at least three signals and in so checking performs a logical operation of negating at least one signal before allowing activation of trip means or close means.

4. A recloser control as claimed in claim 3 wherein the logical operation negates the product of two of the three signals and a negated signal, before allowing activation of the trip means.

5. A recloser control as claimed in claim 1 wherein said secondary overcurrent trip circuitry for each phase and ground being monitored includes:

a fixed minimum trip level provided through an adjustable resistor network;

an operational amplifier receiving input signals proportional to the currents in each phase being monitored and the minimum trip level signal; and a resistor capacitor network in a positive feedback path around the operational amplifier to provide a time current characteristic.

6. A recloser control as claimed in claim 5 wherein said processor means activates a transistor network to bias the summed outputs of the resistor capacitor network of each operational amplifier to disable said secondary overcurrent trip circuitry.

7. A recloser control comprising;

an input circuit for sensing current in each of three phases of a power line and ground, and providing an analog signal for each, said input circuit including a resistor diode circuit such that the input signal is voltage clamped below the normal excursion of the input signal;

a multiplexing circuit for selectively transmitting each of the analog input signals;

a summing amplifier for receiving the analog input signal transmitted by the multiplexer and forcing the analog signal to operate near virtual ground;

a normalizing scaling amplifier for selectively normalizing each of the analog input signals as they are transmitted by the summing amplifier in accordance with a preselected normalizing reference selected from a plurality of normalizing references;

a sample and hold circuit for sampling the analog output of the normalizing scaling amplifier and maintaining it for a desired preselected holding period;

an analog to digital converter for converting the analog output of the sample and hold circuit to a digital form;

memory means for storing command information in digitized form including normalizing references, time current characteristics, instantaneous trip values, number of operations associated with a given time current characteristic, and time intervals for selected measurements and operations and status information such as digitized current magnitudes;

processing means for generating an equivalent to a means square value for each digitized normalized input signal, comparing the means square equivalent values of the inputs with a preselected one of a number of time current characteristics stored in memory means in accordance with other command information stored in the memory means, and receiving and issuing operating signals including an operation command which causes the recloser to change its state between close and trip conditions;

a power supply for selectively supplying power to the other portions of the control from the power line being protected, said power supply including a storage means to supply power when the power lines being protected are interrupted;

a secondary overcurrent trip circuitry which continually receives input signals proportionate to currents in each of the three phases of a power line and ground for generating a trip signal when any sensed current exceeds a fixed secondary time current characteristic after a period of time in accordance with the time current characteristic, if not disabled by said processor means;

output means for activating trip means in the recloser in accordance with operation commands from the processor means or a trip signal from the secondary overcurrent trip circuitry, or close means in the recloser in accordance with operational commands from the processor means; and input means for entering command information.

8. A recloser control comprising:

an input circuit for sensing current in each of the three phases of a power line and ground, and providing an analog signal for each;

a multiplexing circuit for selectively transmitting each of the input analog signals;

a normalizing scaling amplifier for selectively normalizing each of the analog input signals selected by the multiplexer in accordance with a preselected normalizing reference selected from a plurality of normalizing references;

a sample and hold circuit for sampling the analog output of the normalizing scaling amplifier and maintaining it for a desired preselected holding period;

an analog to digital converter for converting the analog output of the sample and hold circuit to a digital form;

memory means for storing command information in digitized form including normalizing references, time current characteristics, instantaneous trip values, number of operations associated with a given time current characteristic, and time intervals for selected measurements and operations, all of which are stored in a electrically alterable non-volatile memory, said memory means further including a volatile memory for storing status information such as digitalized current magnitudes;

processing means for generating an equivalent mean square value for each digitized normalized input signal, comparing the mean square equivalent values of the inputs with a preselected one of a number of time current characteristics stored in memory means in accordance with other command information stored in the memory means, and receiving and issuing operating signals including an operation command which causes the recloser to change its state between close and trip conditions;

alteration means for altering the electrically alterable non-volatile memory under the control of said processing means;

a power supply for selectively supplying power to the other portions of the control from the power line being protected, said power supply including a storage means to supply power when the power lines being protected are interrupted;

a secondary overcurrent trip circuitry which continually receives input signals proportionate to currents in each of the three phases of a power line and ground for generating a trip signal when any sensed current exceeds a fixed secondary time current characteristic after a period of time in accordance with that time current characteristic, if not disabled by said processor means;

output means for activating trip means in the recloser in accordance with operation commands from the processor means or a trip signal from the secondary overcurrent trip circuitry, or close means in the recloser in accordance with operational commands from the processor means, and input means for entering command information.

9. A recloser control comprising:

an input circuit for sensing current in each of the three phases of a power line and ground, and providing a plurality of analog signals for each of varying magnitude for sensitivity purposes;

a multiplexing circuit for selectively transmitting each of the analog input signals;

a normalizing scaling amplifier for selectively normalizing each of the analog input signals selected by the multiplexer in accordance with a preselected normalizing reference selected from a plurality of normalizing references;

a sample and hold circuit for sampling the analog output of the normalizing scaling amplifier and maintaining it for a desired preselected holding period;

an analog to digital converter for converting the analog output of the sample and hold circuit to a digital form;

memory means for storing command information in digital form including normalizing references, time current characteristics, instantaneous trip values, number of operations associated with a given time current characteristic, and time intervals for selected measurements and operations, and status information such as digitized current magnitudes;

processing means for generating an equivalent to a mean square value for each digitized normalized input signal, comparing the mean square equivalent values of the inputs with a preselected one of a number of time current characteristics stored in memory means in accordance with other command information stored in the memory means, and receiving and issuing operating signals including an operation command which causes the recloser to change its state between close and trip conditions;

a power supply for selectively supplying power to the other portions of the control from the power line being protected, said power supply including a storage means to supply power when the power lines being protected are interrupted;

a secondary overcurrent trip circuitry which continually receives input signals proportionate to currents in each of the three phases of a power line and ground or generates a trip signal when any sensed current exceeds a fixed secondary time current characteristic after a period of time in accordance with that time current characteristic, if not disabled by the processor means;

output means for activating trip means in the recloser in accordance with operation commands from the processor means or a trip signal from the secondary overcurrent trip circuitry, or close means in the recloser in accordance with operational commands from the processor means; and input means for entering command information.

* * * * *